(12) United States Patent
Ki et al.

(10) Patent No.: US 11,914,903 B2
(45) Date of Patent: Feb. 27, 2024

(54) SYSTEMS, METHODS, AND DEVICES FOR ACCELERATORS WITH VIRTUALIZATION AND TIERED MEMORY

(71) Applicant: Samsung Electronics Co., Ltd., Suwon-si (KR)

(72) Inventors: Yang Seok Ki, Palo Alto, CA (US); Krishna T. Malladi, San Jose, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/497,882

(22) Filed: Oct. 8, 2021

(65) Prior Publication Data
US 2022/0113915 A1    Apr. 14, 2022

Related U.S. Application Data

(60) Provisional application No. 63/090,710, filed on Oct. 12, 2020.

(51) Int. Cl.
*G06F 3/06* (2006.01)
(52) U.S. Cl.
CPC .......... *G06F 3/0664* (2013.01); *G06F 3/0604* (2013.01); *G06F 3/0679* (2013.01)
(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 8,117,606 B2 *  2/2012  Chakrabarti ............ G06F 8/433
                                                  717/157
9,648,148 B2 *  5/2017  Rimmer ................ H04L 49/358
(Continued)

OTHER PUBLICATIONS

How Compilers Work; Albert Stec; Jul. 14, 2020; retrieved from https://web.archive.org/web/20200922230014/https://www.baeldung.com/cs/how-compilers-work on Nov. 30, 2022 (Year: 2020).*
(Continued)

*Primary Examiner* — Daniel C. Chappell
(74) *Attorney, Agent, or Firm* — Renaissance IP Law Group LLP

(57) ABSTRACT

A device may include an interconnect interface, a memory system including one or more first type memory devices to receive first data, one or more second type memory devices to receive second data, and an accelerator configured to perform an operation using the first data and the second data. The memory system may further include a cache configured to cache the second data for the one or more second type memory devices. A device may include an interconnect interface, a memory system coupled to the interconnect interface to receive data, an accelerator coupled to the memory system, and virtualization logic configured to partition one or more resources of the accelerator into one or more virtual accelerators, wherein a first one of the one or more virtual accelerators may be configured to perform a first operation on a first portion of the data.

11 Claims, 13 Drawing Sheets

(58) Field of Classification Search
CPC ... G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 10,915,468 B2 | 2/2021 | Sharma et al. | |
| 11,025,544 B2 | 6/2021 | Marolia et al. | |
| 11,036,650 B2 | 6/2021 | Agarwal | |
| 2006/0064569 A1* | 3/2006 | Lentz | G06F 12/0813 712/29 |
| 2011/0320804 A1* | 12/2011 | Chan | G06F 3/0688 713/150 |
| 2015/0143372 A1* | 5/2015 | Bercovici | G06F 9/4856 718/1 |
| 2015/0234602 A1* | 8/2015 | Seo | G06F 13/28 710/308 |
| 2016/0379686 A1* | 12/2016 | Burger | G06F 3/0631 711/170 |
| 2017/0344882 A1* | 11/2017 | Ambrose | G06N 3/045 |
| 2018/0150299 A1* | 5/2018 | Balle | G06F 8/656 |
| 2018/0285288 A1 | 10/2018 | Bernat et al. | |
| 2018/0322387 A1* | 11/2018 | Sridharan | G06N 3/063 |
| 2019/0018806 A1* | 1/2019 | Koufaty | G06F 12/0806 |
| 2019/0042240 A1* | 2/2019 | Pappu | G06F 3/0683 |
| 2019/0050335 A1* | 2/2019 | Natu | G06F 12/10 |
| 2019/0102311 A1 | 4/2019 | Gupta et al. | |
| 2019/0294355 A1 | 9/2019 | Shirota et al. | |
| 2020/0310993 A1* | 10/2020 | Kumar | G06F 3/0604 |
| 2020/0327088 A1 | 10/2020 | Choudhary et al. | |
| 2020/0379922 A1 | 12/2020 | Kumar et al. | |
| 2021/0011755 A1 | 1/2021 | Shah | |
| 2021/0011864 A1 | 1/2021 | Bernat et al. | |
| 2021/0042254 A1 | 2/2021 | Marolia et al. | |
| 2021/0064531 A1 | 3/2021 | Bernat et al. | |
| 2021/0073151 A1 | 3/2021 | Sen et al. | |
| 2021/0133123 A1* | 5/2021 | Feehrer | G06F 13/1652 |

OTHER PUBLICATIONS

B. Widrow and M. E. Hoff, "Adaptive switching circuits," in 1960 IRE WESCON Convention Record, 1960. (Year: 1960).*

M. K. Jeong, M. Erez, C. Sudanthi and N. Paver, "A QoS-aware memory controller for dynamically balancing GPU and CPU bandwidth use in an MPSoC," DAC Design Automation Conference 2012, San Francisco, CA, USA, 2012, pp. 850-855. (Year: 2012).*

Y. Jin, S. Kim, T. J. Ham and J. W. Lee, "Architecting a Flash-Based Storage System for Low-Cost Inference of Extreme-Scale DNNs," in IEEE Transactions on Computers, vol. 71, No. 12, pp. 3153-3164, Dec. 1, 2022, doi: 10.1109/TC.2022.3209920. (Year: 2022).*

Y.-T. Chen and J. Cong, "Interconnect synthesis of heterogeneous accelerators in a shared memory architecture," 2015 IEEE/ACM International Symposium on Low Power Electronics and Design (ISLPED), Rome, Italy, 2015, pp. 359-364, doi: 10.1109/ISLPED. 2015.7273540. (Year: 2015).*

Park, Jay H. et al., "HetPipe: Enabling Large DNN Training on (Whimpy) Heterogeneous GPU Clusters through Integration of Pipelined Model Parallelism and Data Parallelism," USENIX Association, 2020 USENIX Annual Technical Conference (USENIX ATC '20) preliminary version, May 28, 2020, 16 pages.

Pinto, Christian, et al., "ThymesisFlow: A Software-Defined, HW/SW co-Designed Interconnect Stack for Rack-Scale Memory Disaggregation," 2020 53rd Annual IEEE/ACM International Symposium on Microarchitecture (MICRO), 2020, pp. 868-880.

Shantharama, Prateek, et al., "Hardware-Accelerated Platforms and Infrastructures for Network Functions: A Survey of Enabling Technologies and Research Studies," IEEE Access, vol. 8, 2020, Jul. 29, 2020, pp. 132021-132085.

\* cited by examiner

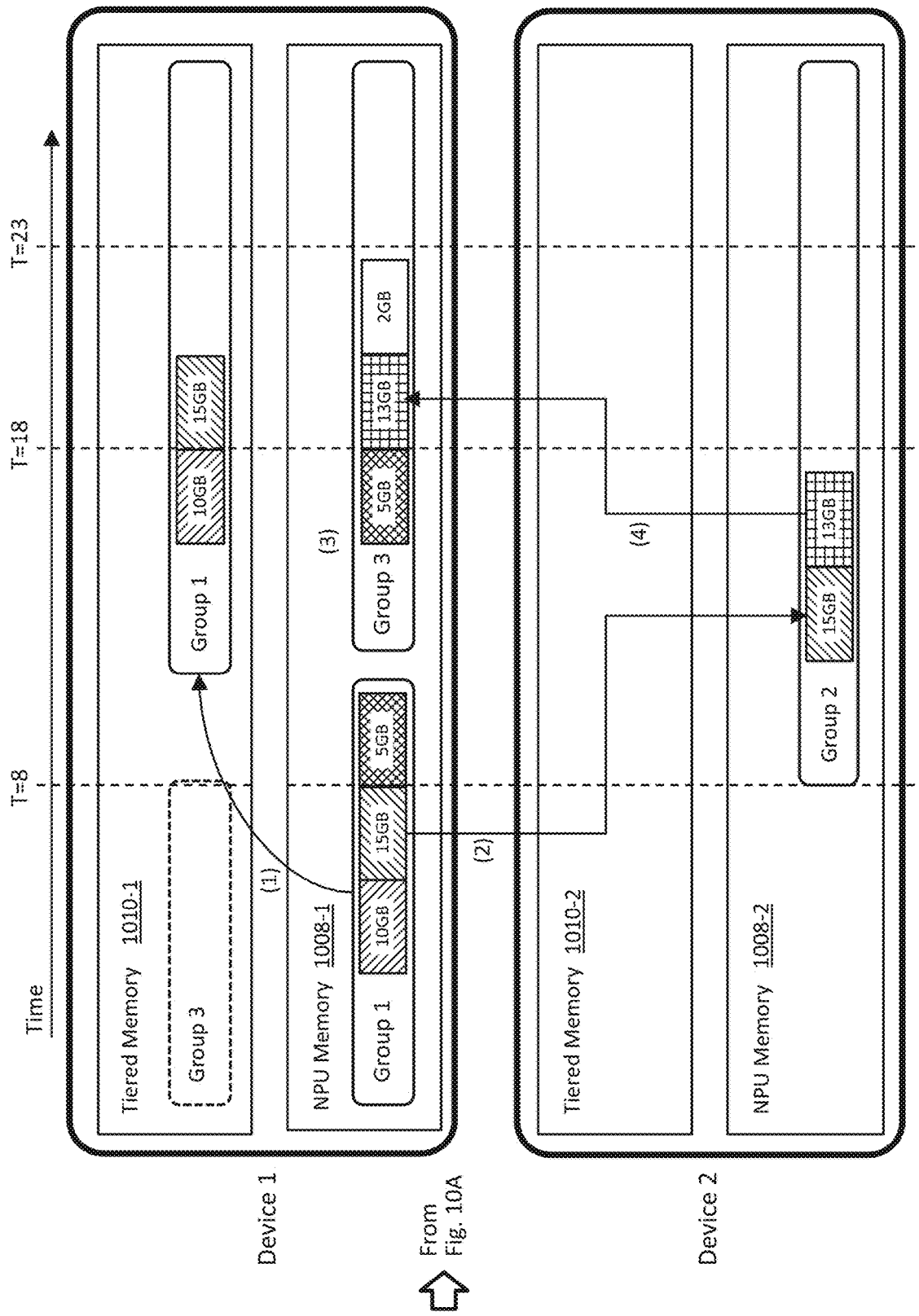

SYSTEMS, METHODS, AND DEVICES FOR ACCELERATORS WITH VIRTUALIZATION AND TIERED MEMORY

CROSS-REFERENCE TO RELATED APPLICATIONS

This application claims priority to, and the benefit of, U.S. Provisional Patent Application Ser. No. 63/090,710 titled "Systems, Methods, and Devices for Memory Coherent Interconnects" filed Oct. 12, 2020 which is incorporated by reference.

TECHNICAL FIELD

This disclosure relates generally to accelerator devices, and more specifically to systems, methods, and devices for accelerators with virtualization and tiered memory.

BACKGROUND

A data processing system may use one or more accelerator devices to increase the throughput of the system. Some data processing workloads, such as machine learning workloads, may involve the use of models that may use large amounts of memory. A model may be partitioned and spread across multiple accelerator devices. A portion of the model may be stored at each accelerator device which may perform operations for the corresponding portion of the model.

The above information disclosed in this Background section is only for enhancement of understanding of the background of the invention and therefore it may contain information that does not constitute prior art.

SUMMARY

A device may include an interconnect interface, a memory system including one or more first type memory devices coupled to the interconnect interface to receive first data, one or more second type memory devices coupled to the interconnect interface to receive second data, and an accelerator coupled to the one or more first type memory devices and the one or more second type memory devices and configured to perform an operation using the first data and the second data. The memory system may further include a cache configured to cache the second data for the one or more second type memory devices. The one or more first type memory devices may include one or more stacked memory devices, the one or more second type memory devices may include one or more nonvolatile memory devices, and the cache may include one or more volatile memory devices. The device may further include a coherency engine configured to maintain a coherency of at least one of the one or more first type memory devices. The device may further include a memory switch arranged to configure one or more connections between the one or more first type memory devices and the accelerator. The memory switch may be arranged to configure one or more connections between the one or more second type memory devices and the accelerator. The device may further include a memory manager configured to exchange the first data between the one or more first type memory devices and the accelerator. The device may further include a preprocessor coupled to the memory system and configured to preprocess the first data. The device may be a first device, the first device may further include a reduce engine configured to exchange the first data with a second device through the interconnect interface.

A device may include an interconnect interface, a memory system coupled to the interconnect interface to receive data, an accelerator coupled to the memory system, and virtualization logic configured to partition one or more resources of the accelerator into one or more virtual accelerators, wherein a first one of the one or more virtual accelerators may be configured to perform a first operation on a first portion of the data. A second one of the one or more virtual accelerators may be configured to perform a second operation on a second portion of the data. The virtualization logic may include one or more registers to configure the one or more virtual accelerators based on configuration information received through the interconnect interface. The virtualization logic may include flow control logic configured to control a flow of data between the one or more virtual accelerators and a host through the interconnect interface. The first one of the one or more virtual accelerators may be configured to receive, through the interconnect interface, one or more operational parameters, and perform the first operation based on the one or more operational parameters. The one or more operational parameters may include one or more of a memory usage, a dependency, or timing information. The device may further include a memory manager configured to schedule one or more portions of the memory system for one or more portions of the first operation. The memory manager may be configured to schedule the one or more portions of the memory system based on a memory access pattern. The memory manager may be configured to determine a first portion of the memory system based on a bandwidth sensitivity, and direct data from the first portion of the memory system to a second portion of the memory system. The device may further include a scheduler configured to multiplex one or more command streams to the one or more virtual accelerators.

A method may include partitioning a model into a first portion and a second portion, storing the first portion of the model in a memory of a device, storing the second portion of the model in the memory of the device, performing, by a first virtual accelerator at the device, a first operation using the first portion of the model, and performing, by a second virtual accelerator at the device, a second operation using the second portion of the model. The model may include one or more of a graph, a machine learning model, or a neural network. Partitioning the model may include partitioning the model, at least in part, by a host. Partitioning the model may include partitioning the model based on one or more parameters of the first portion of the model, and one or more parameters of the first virtual accelerator. The one or more parameters of the first portion of the model may include one or more of a memory usage or a compute usage. The one or more parameters of the first virtual accelerator may include one or more of a memory resource, a compute resource, or an interconnect resource. Partitioning the model may include associating the first portion of the model with a first process address space, and associating the second portion of the model with a second process address space. The method may further include generating a first data group for the first virtual accelerator based on the first portion of the model. The memory may include a memory device of a first type and a memory device of a second type, the method may further include scheduling at least a portion of the first data group for the memory device of the first type and the memory device of the second type. The memory device of the first type may include a working memory for the first virtual accelerator. The method may further include generating a second data group for the second virtual accelerator based on the second portion of the model. The memory may include a first memory device of a first type associated with the first virtual accelerator, a first memory device of a second type associated with the first virtual accelerator, and a second memory device of the first type associated with the second virtual accelerator. The method may further include scheduling at least a portion of the first data group for the first memory device of the first type and the first memory device of the second type, and scheduling at least a portion of the second data group for the first memory device of the first type and the second memory device of the first type.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 10A and FIG. 10B, which collectively form FIG. 10, illustrate an embodiment of a memory scheduling method in accordance with example embodiments of the disclosure.

DETAILED DESCRIPTION

Figure 1:
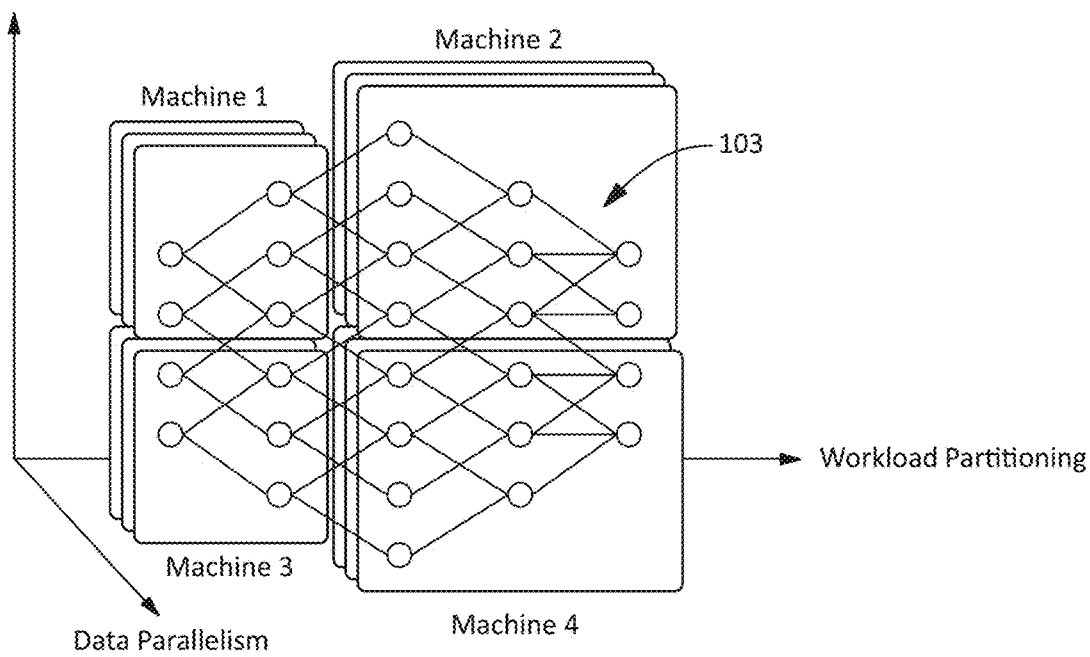
FIG. 1 illustrates an embodiment of a framework for analyzing parallel processing operations in accordance with example embodiments of the disclosure.

Some models for applications such as graph processing, machine learning (ML), and/or the like, may be too large to fit in the memory of an accelerator device. Therefore, the model may be partitioned and spread across multiple accelerator devices. However, this may increase data transfers between a host and the accelerator devices because the accelerator devices may swap different portions of the model into their memory as they process inputs using different portions of the model.

Some accelerator devices in accordance with example embodiments of the disclosure may include multi-tier memory systems. For example, a first tier may include high-bandwidth memory that may function as working memory for the accelerator. A second tier may include high-capacity memory that may store some or all of a model. Depending on the implementation details, this may reduce the time, cost, energy, and/or the like, of moving portions of a large model (and/or input data for the model) into the accelerator device.

In some embodiments, the second tier may include a cache to improve the access speed of more frequently used portions of data stored in the high-capacity memory (e.g., more frequently used portions of a model). Depending on the implementation details, this may reduce the latency of the second tier of memory, which in turn, may improve the performance of the accelerator device in applications such as ML inference which may be latency-sensitive.

Some accelerator devices in accordance with example embodiments of the disclosure may implement one or more virtual accelerators. For example, one or more resources of a physical accelerator (e.g., processor cores, working memory, cache, and/or the like) may be partitioned into multiple virtual accelerators, each of which may appear as a separate accelerator to a host or other device. Depending on the implementation details, this may enable an accelerator device to implement model, data, and/or workload parallelism.

Some embodiments may include a memory switch and/or a memory manager. For example, a memory switch may configure physical connections to, from, and/or between various types of memory that may be used for a first memory tier, a second memory tier, cache, and/or the like, whereas a memory manager may manage data movement between the memory devices and/or between the accelerator device and a host and/or other devices. In some embodiments, a memory manager may control data movement based on one or more learned memory access patterns.

In some embodiments, various amounts of control may be provided to a user and/or an application, for example, through one or more registers and/or application programming interfaces (APIs) that may determine the allocation of resources between virtual accelerators, the allocation of memory resources in a multi-tier memory system, and/or the like.

In some embodiments, a workflow and/or a model such as a graph, a machine learning model, a neural network, and/or the like, may be partitioned between multiple accelerator devices and/or virtual accelerators in accordance with example embodiments of the disclosure. For example, a host may partition a model between virtual accelerators based on the memory requirements and/or compute times of the portions of the model, as well as the memory resources and/or cores of the virtual accelerators. In some embodiments, based on the partitioning, the host may generate a clustered graph with data groups to be executed by the virtual accelerators and scheduled by a memory manager.

The principles disclosed herein have independent utility and may be embodied individually, and not every embodiment may utilize every principle. However, the principles may also be embodied in various combinations, some of which may amplify the benefits of the individual principles in a synergistic manner. For example, some accelerator devices may implement multi-tier memory systems without virtual accelerators, and other accelerators may implement virtual accelerators without tiered memory. However, some embodiments may implement a multi-tier memory system and virtual accelerators in the same device which, depending on the implementation details, may amplify the individual benefits of both features.

FIG. 1 illustrates an embodiment of a framework for analyzing parallel processing operations in accordance with example embodiments of the disclosure. The framework illustrated in FIG. 1 may be used, for example, to analyze graph processing and/or deep learning (DL) applications (e.g., deep neural networks (DNNs)) in which computations and/or portions of a DL model may be distributed across multiple machines such as accelerator devices (e.g, multiple neural processing units (NPUs)). In the embodiment illustrated in FIG. 1, a model 103 may be split across multiple machines Machine 1 through Machine 4 as described below, Using one or more accelerator devices with a large model may be difficult, for example, because only a small portion of the model, and/or input data for the model, may fit in the working memory of the accelerator device. Thus, using an accelerator device to perform a computation may involve the following operations; (1) a portion of a trained model may be moved to the working memory of the accelerator; (2) one or more inputs for the computation (e.g., one or more vectors) may be moved to the working memory of the accelerator device; (3) the accelerator device may perform a computation using the one or more inputs and the portion of the trained model; and (4) the accelerator device may store one or more results of the computation in the working memory and/or send the one or more results to a host or other device. Moreover, to perform a computation for a different portion of the model, operations (1) through (4) may be repeated.

Referring to FIG. 1, various types of parallelism may be used to reduce processing time in accordance with example embodiments of the disclosure. For example, data parallelism may involve splitting data for a workload across multiple machines (e.g., accelerator devices). In some embodiments, data parallelism may reduce processing time (e.g., training and/or inference time). However, depending on the implementation details, data parallelism may be compute bound (e.g., limited by an amount of compute resources), and thus, processing time may increase if a compute limit is reached.

Model parallelism may involve splitting a model across multiple machines (e.g., accelerator devices), each of which may process data for a specific portion of the model. In some embodiments, model parallelism may reduce processing time, however, depending on the implementation details, model parallelism may be memory bound (e.g., limited by an amount of memory resources). For example, a large DL model may cause a system with model parallelism to reach a memory limit.

Workload partitioning may involve splitting a workload (e.g., data and model) across multiple machines (e.g., accelerator devices). In some embodiments, workload partitioning may reduce processing time. For example, with larger batch sizes, processor core utilization and/or accuracy may be improved and/or training times may be reduced. However, depending on the implementation details, workload partitioning may be memory bound and/or compute bound. For example, a large DL model may cause a system with model parallelism to reach a memory limit, in which case, compute resources (e.g., processor cores) may be underutilized.

With any of the types of parallelism described above, memory factors affecting system performance may be based on the width and/or depth of a machine learning model, a data batch size and/or input quality, and/or the like. Moving data may be expensive in terms of time, energy, and/or the like. Adding additional machines may be effective for workloads with large compute requirements, but the machines may be underutilized (and therefore expensive) with memory bound workloads. Moreover, in some embodiments, implementing parallelism in a hyper scaling environment may place an emphasis on inference workloads and/or low latency workloads. For example, some training workloads may be performed offline where relatively high latency may be acceptable. However, online (e.g., real-time) ML workloads may be more sensitive to latency, regardless of batch size. For example, with small batch size inference workloads such as mobile image recognition, users may expect fast results. Similarly, with large batch inference workloads such as language processing, image search, and/or recommendations for ecommerce and/or social media, users may also expect fast results.

Figure 2:
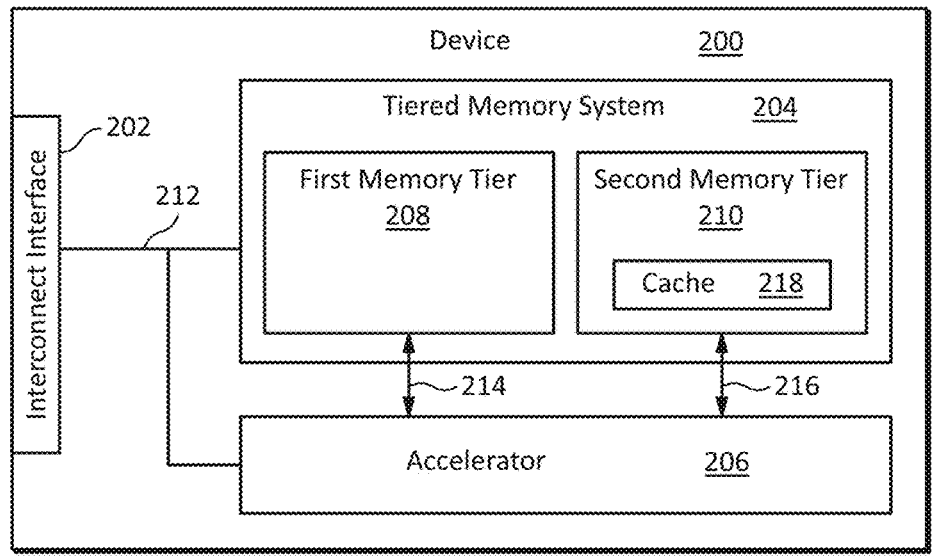
FIG. 2 illustrates an embodiment of a device having tiered memory in accordance with example embodiments of the disclosure.

FIG. 2 illustrates an embodiment of a device having tiered memory in accordance with example embodiments of the disclosure. The device 200 illustrated in FIG. 2 may include an interconnect interface 202, a memory system 204, and an accelerator 206. The memory system 204 may include a first memory tier 208 and a second memory tier 210. The first memory tier 208 may be implemented, at least in part, with a first type memory, and the second memory tier 210 may be implemented, at least in part, with a second type memory. The memory system 204 and accelerator 206 may communicate with the interconnect interface 202 through an interconnect 212. The accelerator 206 may access the first type of memory 208 through a first memory interface 214. The accelerator 206 may access the second type of memory 208 through a second memory interface 216.

In some embodiments, the first type memory in the first memory tier 208 may be implemented with one or more types of memory that may provide relatively high bandwidth. Thus, the first memory tier 208 may be referred to as bandwidth-enhanced memory. For example, the first type memory may be implemented with high bandwidth memory (HBM) that may include one or more stacks of memory devices, one or more interposers, and one or more point-to-point interconnects. As another example, the first type memory may be implemented with dynamic random access memory (DRAM) such as double data rate (DDRX) DRAM of any generation where X may indicate a generation (e.g., DDR2, DDR3, DDR4, etc.), low-power double data rate (LPDDRX) DRAM, and/or the like. Other examples may include synchronous DRAM (SDRAM), static random access memory (SRAM), and/or the like. In some embodiments, the first memory tier 208 may include a combination of different memory types. In some embodiments, the first memory tier 208 may be optimized for bandwidth within the memory system 204.

In some embodiments, the second type memory in the second memory tier 210 may be implemented with one or more types of memory that may provide relatively high capacity. Thus, the second memory tier 210 may be referred to as capacity-enhanced memory. For example, the second type memory may be implemented with nonvolatile memory which may include flash memory such as not-AND (NAND) flash memory, low-latency NAND flash memory, persistent memory (PMEM) such as cross-gridded nonvolatile memory, memory with bulk resistance change, phase change memory (PCM), and/or the like, or any combination thereof. In some embodiments, the second memory tier may be optimized for capacity within the memory system 204.

In some embodiments, the memory system 204 may include a cache 218 arranged to cache data for the first memory tier 208 and/or the second memory tier 210. The cache 218 may be implemented, for example, with relatively low latency memory such as DRAM, SRAM, and/or the like. In some embodiments, the cache 218 may be part of the second memory tier 210. Thus, the second memory tier 210 may be referred to as latency-enhanced memory. In some embodiments, the second memory tier may be optimized for latency within the memory system 204.

The device 200 illustrated in FIG. 2 may be used to implement a wide variety of applications. For example, in some embodiments, the device 200 may be used for ML training and/or inference (e.g., DL and/or DNNs), speech recognition, language processing, image recognition, graph processing, generating recommendations, and/or the like. In some embodiments, the first memory tier 208 may be configured as a high-bandwidth memory that may function as working memory for the accelerator, and the second tier may 210 be configured as a low-latency, high-capacity memory (e.g., using a cache 218) that may store some or all of a model such as a graph or ML model. Depending on the implementation details, this may reduce the time, cost, energy, and/or the like, of moving portions of a model (and/or input and/or output data for the model) into the accelerator device, improve the access speed of one or more portions of the first and/or second memory tiers, reduce the latency of one or more accelerator operations, and/or the like.

The interconnect interface 202 and/or interconnect 212 may be implemented, for example, with one or more of any type of interface and/or protocol including Peripheral Component Interconnect Express (PCIe), Nonvolatile Memory Express (NVMe), NVMe-over-fabric (NVMe-oF), Advanced eXtensible Interface (AXI), Ultra Path Interconnect (UPI), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof. In some embodiments, the interconnect interface 202 may be implemented with one or more memory semantic and/or memory coherent interfaces and/or protocols such as Compute Express Link (CXL), and/or CXL.mem, CXL.io, and/or CXL.cache, Gen-Z, Coherent Accelerator Processor Interface (CAPI), Cache Coherent Interconnect for Accelerators (CCIX), and/or the like, or any combination thereof.

The memory interfaces 214 and 216 may be implemented, for example, with one or more of any type of interface including DDRX, LPDDRX, Open Memory Interface (OMI), NVLink, High Bandwidth Memory (HBM), HBM2, HBM3, and/or any of the interconnect interfaces and/or protocols mentioned above including CXL. The memory interfaces 214 and 216 may be implemented with coherent and/or non-coherent interfaces. For example, a non-coherent memory interface may be used for the memory interface 214 between the first memory tier 208 and the accelerator 206, while a coherent interface may be used for the memory interface 216 between the second memory tier 210 and the accelerator 206.

One or more of the interconnect interface 202, interconnect 212, and memory interfaces 214 and 216 may be implemented as separate components or integrated into an interconnect fabric, for example, using one or more switches to configure connections between the components illustrated in FIG. 2.

The accelerator 206 may be implemented with any type of device that may include one or more processing resources suitable for an accelerator, for example, a graphics processing unit (GPU), a neural processing unit (NPU), tensor processing unit (TPU), an accelerator based on combinational logic, sequential logic, one or more timers, counters, registers, state machines, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors and/or the like, or any combination thereof.

The device 200 may be implemented in any physical and/or electrical configuration and/or form factor such as a free-standing apparatus, an add-in card such as a PCIe adapter or expansion card, a plug-in device, for example, that may plug into a connector and/or slot of a server chassis (e.g., a connector on a backplane and/or a midplane of a server or other apparatus), and/or the like. In some embodiments, the device 200 may be implemented in a form factor for a storage device such as 3.5 inch, 2.5 inch, 1.8 inch, M.2, Enterprise and Data Center SSD Form Factor (EDSFF), NF1, and/or the like, using any connector configuration for the interconnect interface 202 such as a SATA connector, SCSI connector, SAS connector, M.2 connector, U.2 connector, U.3 connector, and/or the like. Any of the devices disclosed herein may be implemented entirely or partially with, and/or used in connection with, a server chassis, server rack, dataroom, datacenter, edge datacenter, mobile edge datacenter, and/or any combinations thereof. In some embodiments, the device 200 may be implemented as a CXL Type-1 device, a CXL Type-2 device, a CXL Type-3 device, and/or the like.

Figure 3:
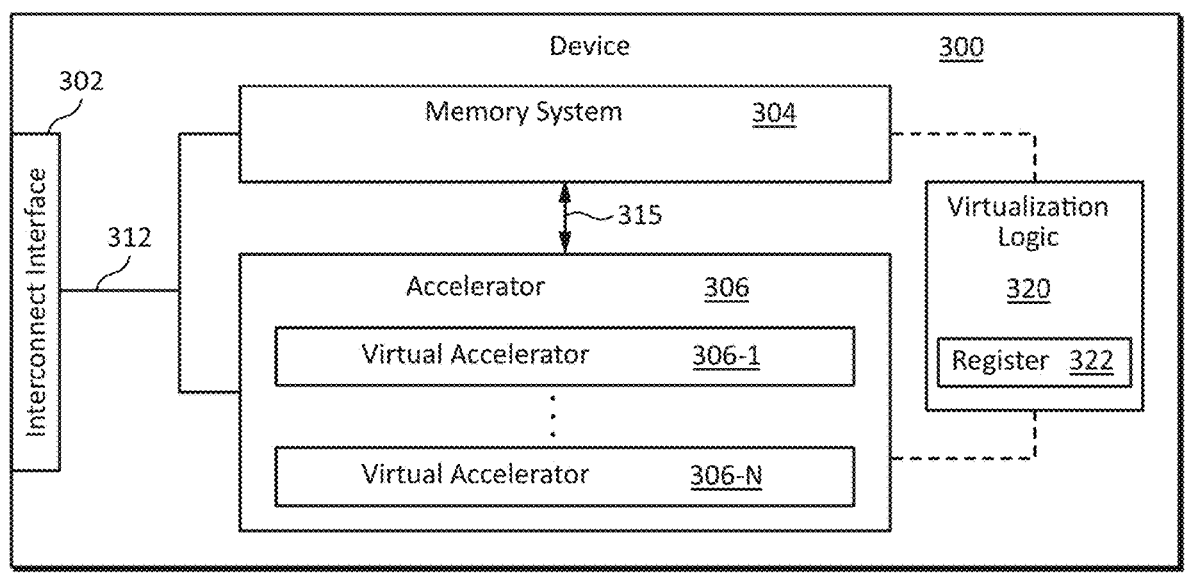
FIG. 3 illustrates an embodiment of a device with accelerator virtualization in accordance with example embodiments of the disclosure.

FIG. 3 illustrates an embodiment of a device with accelerator virtualization in accordance with example embodiments of the disclosure. The device 300 illustrated in FIG. 3 may include an interconnect interface 302, a memory system 304, an accelerator 306, and an interconnect 312 that may be similar to those described above with respect to FIG. 2, although the memory system 304 may or may not implement a tiered memory structure and may instead use any type of memory or combination thereof in any configuration. The accelerator 306 may be interfaced to the memory system 304 through one or more memory interfaces 315 of any type.

The device 300 may also include virtualization logic 320 that may partition one or more resources of the accelerator 306 into one or more virtual accelerators 306-1, . . . , 306-N. Accelerator resources that may be partitioned may include processing resources (e.g., processor cores), registers, memory resources, interconnect resources, and/or the like. For example, in some embodiments, the virtualization logic 320 may allocate one or more physical processor cores of the accelerator 306 to one or more of the virtual accelerators 306-1, . . . , 306-N. The virtualization logic 320 may also allocate a portion of memory from the memory system 304 to one or more of the virtual accelerators 306-1, ..., 306-N. In embodiments in which the memory system 304 is implemented with tiers, the virtualization logic may allocate a portion of memory from each tier to one or more of the virtual accelerators 306-1, ..., 306-N. In embodiments in which a memory tier may include a cache, a portion of the cache may be allocated to one or more of the virtual accelerators 306-1, ..., 306-N.

In some embodiments, the virtualization logic 320 may also allocate separate interconnect resources such as ports to one or more of the virtual accelerators 306-1, ..., 306-N, Depending on the implementation details, one or more of the virtual accelerators 306-1, ..., 306-N may appear as separate accelerators to a host or other device. For example, each of the virtual accelerators 306-1, ..., 306-N may be implemented as a separate endpoint having a separate device identifier (ID). In some embodiments, virtual accelerators may be implemented as separate endpoints by implementing the device 300 as a multi-headed device in which each of the virtual accelerators 306-1, ..., 306-N may have a separate port.

The virtual accelerators 306-1, ..., 306-N may be implemented with various amounts of isolation between the virtual accelerators. For example, in some embodiments, all of the resources (e.g., processor cores, memory, ports, and/or the like) for each virtual accelerator may be completely isolated such that the individual virtual accelerators may not compete for resources, and/or each virtual accelerator may not pollute the memory (e.g., cache) of any other virtual accelerator. As another example, in some embodiments, one or more resources (e.g., an interconnect port, a portion of cache, and/or the like) may be partially or fully shared between virtual accelerators.

In some embodiments, the virtualization logic 320 may be programmable, for example, using one or more registers 322 that may be accessed by a user or application through the interconnect interface 302 (e.g., using an API). For example, the virtualization logic 320 may be programmed to configure a first virtual accelerator 306-1 to perform a first operation on a first portion of data received through the interconnect interface 302 and stored in the memory system 304. The virtualization logic 320 may further be programmed to configure a second virtual accelerator 306-2 to perform a second operation on a second portion of the data received through the interconnect interface 302 and stored in the memory system 304. In some embodiments, the first and second portions of the data may be stored in separate portions of the memory system 304 that may be allocated to the separate virtual accelerators 306-1 and 306-2.

A device with accelerator virtualization in accordance with example embodiments of the disclosure may be used in a wide variety of applications. For example, in some embodiments, a model (e.g., a graph, an ML model, and/or the like) may be partitioned into portions that may each be assigned to a virtual accelerator to implement model parallelism. Depending on the implementation details, this may enable a relatively large model to be implemented efficiently across multiple virtual accelerators. Moreover, the use of virtual accelerators in accordance with example embodiments of the disclosure may reduce or eliminate memory bound limitations, especially if the virtual accelerators are implemented in conjunction with a tiered memory system in accordance with example embodiments of the disclosure.

For purposes of illustrating the principles of this disclosure, some example embodiments are described below in the context of systems, methods, and/or devices that may use specific implementation details such as CXL interconnects and/or protocols, CXL Type-2 devices, DRAM for caches, flash memory for capacity-enhanced memory, NPUs for accelerators, DL and/or graph models, and/or other implementation details. The principles, however, are not limited to these example implementation details and may be applied to embodiments that may use any other interconnects, protocols, memory types, device types, accelerators, models, and/or the like.

Figure 4A:
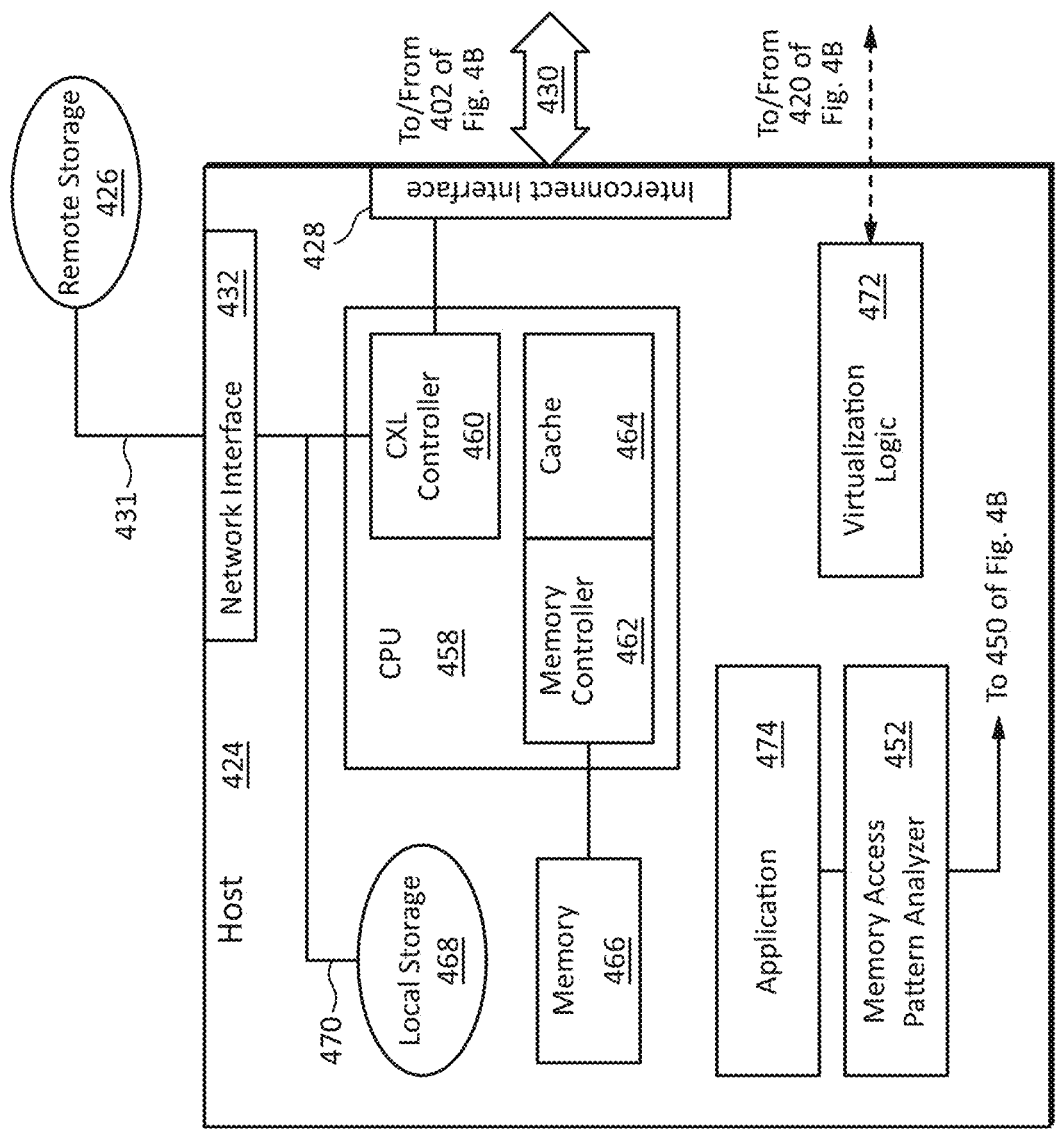
FIG. 4A illustrates an example embodiment of a host in accordance with example embodiments of the disclosure.
Figure 4B:
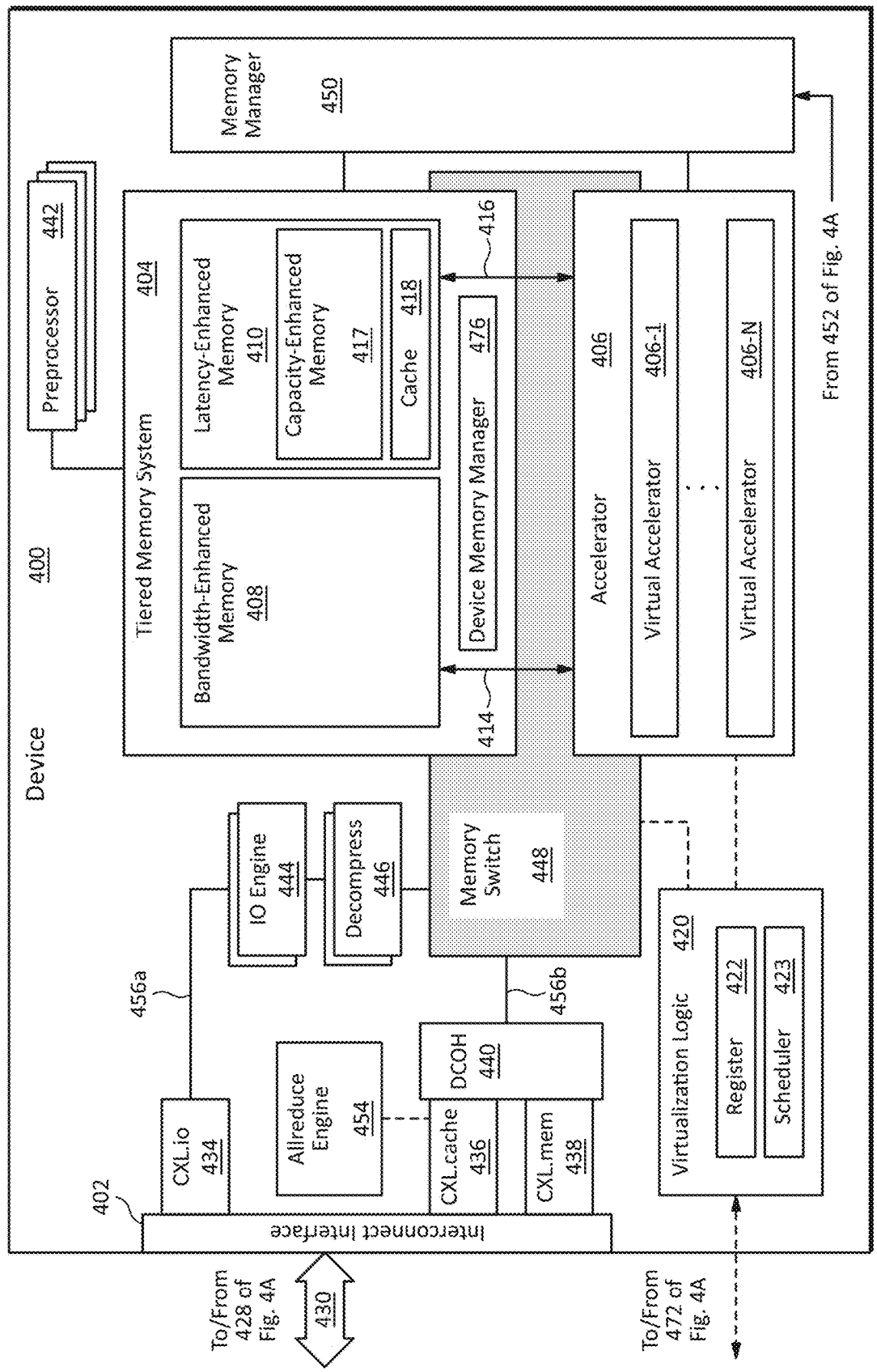
FIG. 4B illustrates an example embodiment of a device with tiered memory and virtual accelerators in accordance with example embodiments of the disclosure.

FIG. 4A illustrates an example embodiment of a host in accordance with example embodiments of the disclosure. FIG. 4B illustrates an example embodiment of a device with tiered memory and virtual accelerators in accordance with example embodiments of the disclosure. FIG. 4A and FIG. 4B are collectively illustrate an example embodiment of a system in accordance with example embodiments of the disclosure and are referred to collectively as FIG. 4. The embodiment illustrated in FIG. 4 may be used, for example, to implement any of the embodiments described above (including one or more of the features thereof) with respect to FIG. 2 and FIG. 3.

Referring to FIG. 4, the system may include a device 400 and a host 424 that may communicate through an interconnect 430. In some embodiments, the system may further include remote storage 426 that may communicate with the host 424 through a network 431 and network interface 432 as shown in FIG. 4, but in other embodiments, the remote storage 426 may be connected to the system in any other manner, for example, through one or more interconnects such as interconnect 430 using a switch.

The device 400 may include a tiered memory system 404 having a bandwidth-enhanced memory 408 and a latency-enhanced memory 410 that may include capacity-enhanced memory 417 and a cache 418. The bandwidth-enhanced memory 408 may be implemented, at least partially, with one or more bandwidth-enhanced point-to-point memory devices such as LPDDRX devices and/or HBM devices that may include a stack of memory dies with an interposer. The latency-enhanced memory 410 may be implemented, at least partially, with capacity-enhanced memory 417 such as low-latency NAND memory and a DRAM cache 418.

The device 400 may also include one or more accelerators 406 which, in this example, may be implemented as an NPU. The NPU 406 may be partitioned into one or more virtual NPUs 406-1, 406-N by virtualization logic 420 which may be programmed, for example, using one or more registers 422. The virtualization logic 420 may operate, for example, in a manner similar to the virtualization logic 320 described above with respect to FIG. 3.

Referring to FIG. 4, the virtual NPUs 406-1, 406-N may be interfaced to the bandwidth-enhanced memory 408 through a non-coherent memory interface 414 such as DDRX and/or NVLINK. The virtual NPUs 406-1, ..., 406-N may be interfaced to the latency-enhanced memory 410 through a coherent interface 416 such as CXL. Although the memory interfaces 414 and 416 are shown as separate interfaces, in some embodiments, they may be integrated, for example, as a memory interface fabric. In some embodiments, some or all of the bandwidth-enhanced memory 408 may function as a working memory for the NPU 406 and/or one or more of the virtual NPUs 406-1, ..., 406-N, The device 400 may also include an interconnect interface 402 which, in this example, may be implemented as a CXL interface and use a CXL.io protocol interface 434, a CXL.cache protocol interface 436, and/or a CXL.mem protocol interface 438. A device coherency (DCOH) engine 440 (e.g., a coherency agent) may resolve coherency of one or more caches at the device and/or manage one or more CXL bias states.

In some embodiments, the device 400 may also include a memory switch 448. In some embodiments, a memory switch 448 may configure physical connections to, from, and/or between various types of memory that may be used for first tier memory, second tier memory, cache, and/or the like. Although the memory switch 448 is shown as a single component, in some embodiments, it may be implemented in a distributed manner with one more portions of the memory switch 448 located within and/or between any of the components of the tiered memory system 404, any components of the NPU 406, and/or the like, for example, as shown by the overlap between the memory switch 448, the tiered memory system 404, and the NPU 406 in FIG. 4. Thus, in some embodiments, the memory switch 448, and/or any components of the tiered memory system 404 and/or NPU 406 may form a memory fabric in which the memory switch 448 may function as a memory fabric manager. In some embodiments, the memory manager may implement one or more memory configurations using topologies such as torus, mech, point-to-points, and/or the like.

In some embodiments, the memory switch 448 may be programmable, for example, by an application through an API, to configure the memory switch 448, and/or any components of the tiered memory system 404 and/or NPU 406. For example, a programmer may know that a certain workload to run on the NPU 406 or one of the virtual NPUs 406-1, . . . , 406-N may require, or benefit from, a specific amount of cache 418. Thus, the programmer (e.g., through an application) may program the memory switch (e.g., through an API) to configure the specific amount of cache to the NPU 406 or one of the virtual NPUs 406-1, . . . , 406-N.

In some embodiments, the device 400 may also include a memory manager 450. The memory manager 450 may manage data movement within the tiered memory system 404, between any components of the tiered memory system 404 and the NPU 406, between any components of the tiered memory system 404 and a host and/or other devices, and/or the like. Thus, the memory switch 448 may configure a physical arrangement of memory and other resources, whereas the memory manager 450 may manage data movement within the configured memory arrangement. In some embodiments, the memory switch 448 and or the memory manager 450 may configure memory and/or control data movement based on one or more observed or learned memory access patterns as determined, for example, by a memory access pattern analyzer 452. In some embodiments, the memory manager 450 may implement one or more cache algorithms and/or cache policies.

In some embodiments, the device 400 may also include one or more preprocessors 442, one or more input and/or output (I/O or IO) engines 444, and/or one or more compression and/or decompression logic 446. A preprocessor may perform any function that may prepare data for processing by the NPU 406 and/or one or more virtual NPUs 406-1, . . . , 406-N. For example, preprocessing may be used for data cleaning (e.g., eliminating noise, filling in missing or null values, and/or the like), data transformation (e.g., standardizing, normalization, feature selection, and/or the like), data organization, data reduction (e.g., aggregation, numerosity reduction, dimensionality reduction and/or the like), and/or the like.

An IO engine 444 may implement one or more IO related functions such as data deduplication, offloading preprocessing of all or a portion of a dataset (e.g., to a preprocessor 442), and/or the like. The compression and/or decompression logic 446 may help improve the effective bandwidth of the interconnect interface 402 by compressing data before sending it out, and/or decompressing data after receiving it, through the interconnect interface 402.

In some embodiments, the device 400 may also include an allreduce engine 454 that may perform one or more operations associated with an allreduce operation. For example, the allreduce engine 454 may help schedule transfers of data (e.g., tensors, updates from NPUs, and/or the like) between NPUs, devices, and/or the like.

Some embodiments may include one or more internal interconnects between any of the various components, some examples of which are identified as 456a and 456b (which may be referred to collectively as 456) in FIG. 4. Any of the internal interconnects 456 may be implemented with any type of bus, point-to-point connection, and/or the like, In some embodiments, one or more internal interconnects 456 may be implemented with PCIe, NVLink, AXI, and/or the like, In some embodiments, one or more of the internal interconnects 456 may be implemented with packet processing (e.g., to increase the bandwidth of data movement within and/or between any of the components illustrated in FIG. 4). Packet processing may be implemented, for example, using one or more network on chip (NOC) devices to perform packet processing on any of the internal interconnects 456.

The host 424 may include a CPU 458 having an interface (e.g., CXL) controller 460, a memory controller 462, and an internal host cache 464. The memory controller 462 may control the internal host cache 464 and/or one or more host (e.g., system) memories 466. In some embodiments, the cache may be implemented with SRAM, and the host memory 466 may be implemented with DRAM.

The host 424 may include an interconnect interface 428 which, in this example, may be implemented as a CXL interface and use one or more of the CXL.io, CXL.cache, and/or CXL.mem protocols.

The host 424 may also include local storage 468 which may be implemented, for example, with any type of storage device(s) based on any type of memory and/or storage media including solid state media, magnetic media, optical media, and/or the like.

The host 424 may also include a network interface 432 that may provide access to remote storage 426 and/or any other systems, hosts, devices, and/or the like. The network interface 432 may be implemented, for example, as a network interface card (NIC) that may use any suitable networking interface and/or protocol including Ethernet, TCP/IP, RDMA, ROCE, and/or any other interfaces and/or protocols including those mentioned above. The remote storage 426 may be implemented, for example, with any type of storage device(s) based on any type of memory and/or storage media including solid state media, magnetic media, optical media, and/or the like, and configured in a server chassis, server rack, dataroom, datacenter, edge datacenter, mobile edge datacenter, and/or any combinations thereof.

The CPU 458, local storage 468, and/or network interface 432 may communicate, for example, through a system bus 470.

The host 424 may also include accelerator (e.g., NPU) virtualization logic 472 which may work in cooperation with the virtualization logic 420 at the device 400 to partition, manage, and/or use one or more virtual NPUs 406-1, . . . , 406-N. Either of the host-side virtualization logic 472 and/or device-side virtualization logic 420 may be implemented in hardware, software, or a combination thereof. For example, in some embodiments, the device-side virtualization logic 420 may be implemented primarily in hardware to partition resources associated with the NPU 406 into one or more virtual NPUs 406-1, 406-N, whereas the host-side virtualization logic 472 may be implemented primarily in software, for example, at least partially in a device driver for the device 400 and/or at least partially in one or more applications 474. In some embodiments, a device driver in host-side virtualization logic 472 may receive one or more commands from an application 474 through an API to program one or more registers 422 in the device-side virtualization logic 420 to create, manage, and/or use one or more of the virtual NPUs 406-1, . . . , 406-N.

In some embodiments, the device-side virtualization logic 420 and/or host-side virtualization logic 472 (which may be referred to collectively as virtualization logic) may provide flow control for one or more of the virtual NPUs 406-1, . . . , 406-N. In some embodiments, flow control may determine that each virtual NPU may saturate (e.g. be limited to) at a certain amount of bandwidth between the virtual NPU and the host 424. In some embodiments, flow control may be provided on a per-partition (e.g., per virtual NPU) basis. This may be referred to as spatial multiplexing which may implement a form of parallelism across multiple virtual NPUs.

In some embodiments, the virtualization logic may include a hardware and/or software scheduler 423 to identify command streams that may be multiplexed among virtual NPUs. This may be referred to as time multiplexing and/or scheduling.

In some embodiments, time multiplexing may be combined with spatial multiplexing. For example, ten different command streams may be time multiplexed across ten different virtual NPUs to present the appearance of 100 different NPUs. Depending on the implementation details, the time and/or spatial multiplexing may be distributed among virtual NPUs based, for example, on the amount of resources each virtual NPU may have.

In some embodiments, the network interface 432 and/or remote storage 426 may initiate a DMA transaction to the tiered memory system 404. For such a transaction, the data path may be through the network interface 432, the CXL controller 460, the host-side interconnect interface 428, the interconnect 430 (using the CXL.io) protocol, the device-side interconnect interface 402, and the memory switch 448.

In processing the DMA transaction, the memory switch 448 may use one or more queues that may be separate from one or more queues used for CXL transactions (e.g., for a vector transfer using a flit). The use of separate queues may avoid conflicts that may be caused by receiving a request from the host via the CXL.mem and/or CXL.cache interfaces while performing a bulk transfer (e.g., DMA) through CXLio. Some embodiment may implement a system of priorities for DMA and/or CXL transfers.

In some embodiments, a list of physical address ranges may be maintained, for example, by a remote server, to help initiate peer RDMA requests via the network interface 432 using one or more DMA engines. Address ranges may be maintained for one or more devices such as device 400 and/or any virtual NPUs or other accelerators within each device.

To perform a DMA transfer to the NPU 406, the initiating device may use a destination (e.g., target) buffer in the device 400. Thus, in some embodiments, the memory manager 450 may allocate one or more target buffer locations for DMA transfers.

In some embodiments, the CXL interface 402 may implement the CXLio, CXLmem, and/or CXL.cache capabilities using host-managed device memory (HDM) which may be allocated from one or more portions of the tiered memory system 404. For example, data transferred by the host 424 to the device 400 using CXL may be placed in an HDM region of memory. In some embodiments, the host 424 may not be aware of any other memory at the device 400 other than the HDM memory, One or more memory regions exposed to the host 424 may be indicated, for example, by one or more start and/or end addresses in base address registers (BARs). For example, in a device 400 having a total of 1 TB of memory in second memory tier 410, only 10GB of the 1 TB may be exposed to the host 424 as HDM.

Any or all of the components and/or capabilities of the device 400 may be configured, managed, operated, implemented, and/or the like, with the assistance of firmware that may run, for example, on a RISC processor core on the device 400. For example, in some embodiments, firmware at the device 400 may determine how much and/or which type of memory of the tiered memory system 404 to expose to the host 424 (e.g., as HDM) and/or which device capabilities to expose to the host 424. These determinations may be based, for example, on the total resources available at the device 400, resources that may be committed to other uses, and/or the like.

In embodiments in which the device 400 is implemented as a CXL Type-2 device, I/O transactions may follow any generation of PCIe protocol using Address Translation Service (ATS). For example, for the device 400 to request access to the host memory 466 (e.g., using CXL.cache), the device 400 may use ATS to make the request because the device 400 may not know the actual physical address in the host memory 466 for which to make the request. ATS may be implemented, for example, in the CXL controller 460 using an input-output memory management unit (IOMMU) and/or a device-side translation lookaside buffer (DTLB) which may cache one or more address translations. In some embodiments, this may enable the device 400 to pull data from the host memory 466 (e.g., using CXL.cache) and/or remote storage 426 on an on-demand basis.

The host 424 may also include a memory access pattern analyzer 452 that may monitor and/or analyze memory accesses throughout the system including within and between the tiered memory system 404, the NPU 406, and/or one or more of the virtual NPUs 406-1, . . . , 406-N to determine one or more memory access patterns that may be used, for example, to configure one or more components of the tiered memory system 404, the NPU 406, and/or the like for more efficient operation. In some embodiments, the memory access pattern analyzer 452 may use one or more ML techniques to identify one or more memory access patterns.

The host 424 may run any type of applications 474 relating to the use of one or more NPUs and/or other types of accelerators that may be implemented by the device 400. For example, the host 424 may run one or more applications that may use the device 400 to implement graph processing, ML frameworks, including one or more DL frameworks such as TensorFlow, PyTorch, and/or the like.

As mentioned above, using one or more accelerator devices with a large model may be difficult, for example, because only a small portion of the model, and/or input data for the model, may fit in the working memory of the accelerator device. Depending on the implementation details, adding enough additional working memory to hold the entire model may be prohibitively expensive, for example, in terms of economic cost, space, power consumption, and/or the like. Therefore, using one or more accelerator devices with a large model may involve expensive data transfers to and/or from a host to swap different portions of a model into the working memory of an accelerator device.

However, in some embodiments, the system illustrated in FIG. 4 may be used to implement a large DL model (e.g., a large DNN model), for example, by using capacity-enhanced memory 417 such as flash memory (e.g., low-latency NAND memory) in the second memory tier 410 which may, depending on the implementation details, be used to hold an entire DL model at an acceptable cost in terms of economics, space, power consumption, and/or the like. Therefore, the system may reduce or eliminate data transfers associated with using an accelerator device with a DL model.

Moreover, the use of cache 418 (e.g., DRAM) in the latency-enhanced memory 410 may compensate for potential latency issues with the flash memory (e.g., data may be moved quickly from the second memory tier 410 to the first memory tier 408).

Moreover, the system may enable the use of multiple techniques for implementing a DL model in accordance with example embodiments of the disclosure. For example, CXL may be used in conjunction with PCIe, and therefore, the system and/or the device 400 may be able to chose between PCIe and CXL transfers depending on the specific situation. For example, direct memory access (DMA) over PCIe may be used at a 4 KB granularity to transfer a large trained model into the second memory tier (latency-enhanced and/or capacity-enhance memory) 410, e.g., before the trained model for inference. This may be referred to as placing the model behind the NPU 406. In some embodiments, PCIe transfers may be implemented using the CXL.io protocol, which, depending on the implementation details, may operate essentially as PCIe.

Runtime input data for the model may be received at the host 424, for example, through the network interface 432. The input data may be transferred from the host 424 to the working memory of the NPU 406 (e.g., first memory tier 408 of bandwidth-enhanced memory) so the NPU 406 may process the input data using the model. Although PCIe may not provide coherency, it may still be used to transfer input data (e.g., DL vectors) into the working memory for example, by pushing the input data into the working memory and then notifying the NPU 406 that the data is available. (For simplicity, in some embodiments, the NPU 406 and/or any of the virtual NPUs 406-1, . . . , 406-N may be referred to collectively as the NPU 406.)

As another example, CXL may be used to transfer input data from the host 424 to the working memory 408. In some embodiments, a potential advantage of using CXL to transfer input data (e.g., DL vectors) is that the coherency of CXL may allow the data to be transferred in a passive manner, e.g., on demand by the NPU 406 (and/or any of the virtual NPUs 406-1, 406-N). For example, because the NPU 406, the working memory 408, and/or the host 424 may be in the same coherency domain, and thus, when the NPU 406 may use a cache line to work on, it may make a cache line request. Moreover, CXL may provide for smaller granularity data transfers (e.g., 64B flits). Depending on the implementation details, this may reduce or eliminate unnecessary data transfers and/or enable more efficient data transfers.

In some embodiments, the cache memory 418 may be implemented with hardware control, software control, or a combination thereof. For example, in some embodiments, control of some or all of the cache 418 may be determined by hardware microarchitecture with little or no software control. Hardware control of the cache 418 may be beneficial, for example, where the data has good spatial and/or temporal locality, in which case, offloading the control work to hardware may be more efficient. Hardware control of the cache 418 may also be beneficial with small granularity data transfers because it may be difficult for software to migrate small portions of data because of software overhead associated with controlling the cache 418. With hardware based caching, the cache 418 may be transparent to the NPU 406, e.g., the NPU 406 may only see the capacity-enhanced memory 417 (e.g., NAND flash), but with the benefit of reduced latency provided by faster memory (e.g., DRAM) of the cache 418.

As another example, in some embodiments, the cache 418 may be controlled primarily through software. For example, software control of the cache 418 may enable a programmer (e.g., through an application) to control which input data vectors to prefetch into cache, which portion of a model store in NAND flash to prefetch into cache, and/or the like. Software control of the cache 418 may be beneficial, for example, where the data lacks spatial and/or temporal locality (e.g., with streaming data accesses) in which case, a programmer may be able to make better decisions regarding which data to cache. Also, with large granularity data transfers, the software overhead may be smaller and therefore, it may be beneficial to provide the programmer and/or application with greater control of where to place and/or move data.

In some embodiments, the memory switch 448 and/or memory manager 450 may implement hardware intelligence to identify hot data (e.g., frequently used or likely to be used blocks, pages, lines, and/or the like) to move and/or keep in the cache 418 and/or cold data to move out of the cache 418. In some embodiments, the memory switch 448 and/or the memory manager 450 may implement the control logic for hardware and/or software control of the cache 418. In some embodiments, the memory switch 448 and/or memory manager 450 may implement stream detection and/or prefetch to facilitate predicting which data to prefetch into cache. In some embodiments, the cache 418 may operate as a staging area for portions of a model and/or input data that may be prefetched (e.g., hot vectors and/or hot indices) to reduce or prevent accesses of the capacity-enhanced memory 41 (e.g. flash memory).

An NPU 406 or other type of accelerator may be implemented, in some embodiments, with a single instruction, multiple data (SIMD) engine and/or multiple streaming units. One or more NPUs 406 may be used to implement a dataflow processing engine distributed across one or more clusters, wherein each cluster may include a dataflow engine or SIMD engine, one or more registers, a floating point (FP) unit, and/or a tile of SRAM cache. In some embodiments, a translation lookaside buffer (TLB) may be used to speed up addressing. In some embodiments, one or more multi-tier caches may be implemented across computer clusters.

The host 424 and NPU 406 may share one or more cache lines, in some embodiments, in a coherent memory space that may be maintained in a coherent state by the CXL controller 460 and/or DCOH engine 440. The DCOH engine 440 may implement cache line snooping to track the existence and/or state of one or more cache lines on the device side to enable the device 400 to respond when the host 424 requests a cache line from the device 400. In some embodiments, the DCOH engine 440 may respond to a host snoop on a device-to-host (D2H) response channel, for example, because the device may hold dirty data. To implement the CXL.cache interface, the DCOH engine 440 may implement response and/or request logic to generate a response to a request from the host 424 for a D2H transfer, and/or to generate a request by the device 400 for a host-to-device (H2D) transfer. In some embodiments, the DCOH engine 440 may enable the device 400 to request one or more cache lines from elsewhere in the system besides the host. For example, the device 400 may request one or more cache lines from a different device, accelerator, memory extension, memory buffer, and/or the like, and CXL controller 460 at the host 424 make facilitate a transfer of the requested cache line to the device 400.

The DCOH engine 440 may track a bias state such as a device bias and/or a host bias in embodiments in which the device 400 is implemented as a CXL Type-2 device. In a device bias state, an NPU or other type of accelerator may access device local memory without a performance penalty that may be associated with a host bias state, however, a host may still access the device local memory using coherent semantics.

Some embodiments of a device 400 may provide one or more enhancements to a CXL or other memory coherent and/or memory semantic interface and/or protocol. For example, a coherent region of device memory (e.g., any memory in the tiered memory system 404) may be written by multiple sources such as the host 424, the device 400, and/or other hosts, devices, and/or the like. An implementation of a device 400 in accordance with example embodiments of the disclosure may handle writes to the coherent region from these multiple sources by (1) limiting the coherent region visible to the host (e.g., the HDM), and/or (2) using the DCOH to order (and/or enforce the order) of the writes. Depending on the implementation details, this may improve performance, for example, where the order of multiple writes from multiple sources may be undefined. Thus, the DCOH may define the order of writes (e.g., strictly, loosely, and/or the like). Similar techniques may be applied to reads.

The host 424 may perform read and/or write accesses of a coherent region of the device memory, in some embodiments, using a master to subordinate protocol. Upon a read request, a device may respond with a data and/or no-data response (NDR) field.

The memory manager 450 may manage how memory lines may be distributed between the first memory tier 408 and the second memory tier 410. The memory manager 450 may also implement cache management between the cache (e.g., DRAM) 418 and a capacity-enhanced memory 417 (e.g., flash memory) in the second memory tier 410. In some embodiments, the memory manager 450 may implement hardware based caching and/or software based caching, for example, with one or more parameters to expose both regions of cache 418 and capacity-enhanced memory 417 to one or more software layers such as an application 474 that may implement a framework.

In some embodiments, the memory manager 450 may implement a tag cache manager and/or a controller for the cache 418 (e.g., a DDR controller if DDR DRAM is used for the cache 418).

In some embodiments, large granularity transfers, e.g., a system-wide copy of an entire model from a network buffer or external storage device to the capacity-enhanced memory 417, may use DMA flows on PCIe through the CXL.io interface 434. Smaller granularity transfers may use CXL flows through the CXL.mem interface 438. In some embodiments, in addition to initially populating the capacity-enhanced memory 417 with a model, the memory manager 450 may enable an application 474 on the host 424 to access the capacity-enhanced memory 417, either directly or indirectly through a window of cache 418, to facilitate swapping in and/or out one or more portions of a model between the capacity-enhanced memory 417 and the cache 418. In some embodiments, the memory manager 450 may separate one or more regions of the first memory tier 408 and the second memory tier 410 that may be exposed to the host 424 in a manner that may be configurable, for example, through one or more registers in the memory manager 450 that may be accessed through an API. Thus, in some embodiments, a large DL model may be swapped into and/or out of the capacity-enhanced memory 417 (e.g., NAND flash) for initial population before runtime. However, during runtime such as using the model for inference, there may be one or more portions of the model that may be accessed more frequently, which may be facilitated by caching the one or more portions of the model using the cache 418 between the tiers 408 and 410.

A device memory manager 476 may be included in some embodiments to manage one or more aspects of memory devices, storage devices, and/or the like within the tiers 408 and 410. Whereas the memory manager 450 may implement cache algorithms, manage data movement between tiers 408 and 410, and/or the like, the device memory manager 476 may perform lower level functions such as wear leveling, address translation, hash tables, tag management, extra logic, data movement within memory devices, storage devices, and/or the like. In some embodiments, the device memory manager 476 may implement a signaling scheme that may enable an application 474 (e.g., a DL framework) to indicate one or more base addresses, offset addresses, and/or the like for active portions of a model. This may enable the device memory manager 476 to move data transparently to the host and/or NPU using hardware. In some embodiments, the device memory manager 476 may implement one or more hardware techniques to determine bandwidth sensitive portions of memory without involvement by the host 424, NPU 406, and/or the like. In some embodiments, the device manager 476 may expose one or more controls through an API, for example, to enable a programmer who may know a wear level pattern for a specific application to implement a wear leveling scheme for that application.

In some embodiments, one or more devices having accelerator virtualization and/or tiered memory in accordance with example embodiments of the disclosure may be used to implement memory and/or accelerator dis-aggregation, for example, through the use of single-level and/or multi-level switching.

Figure 5:
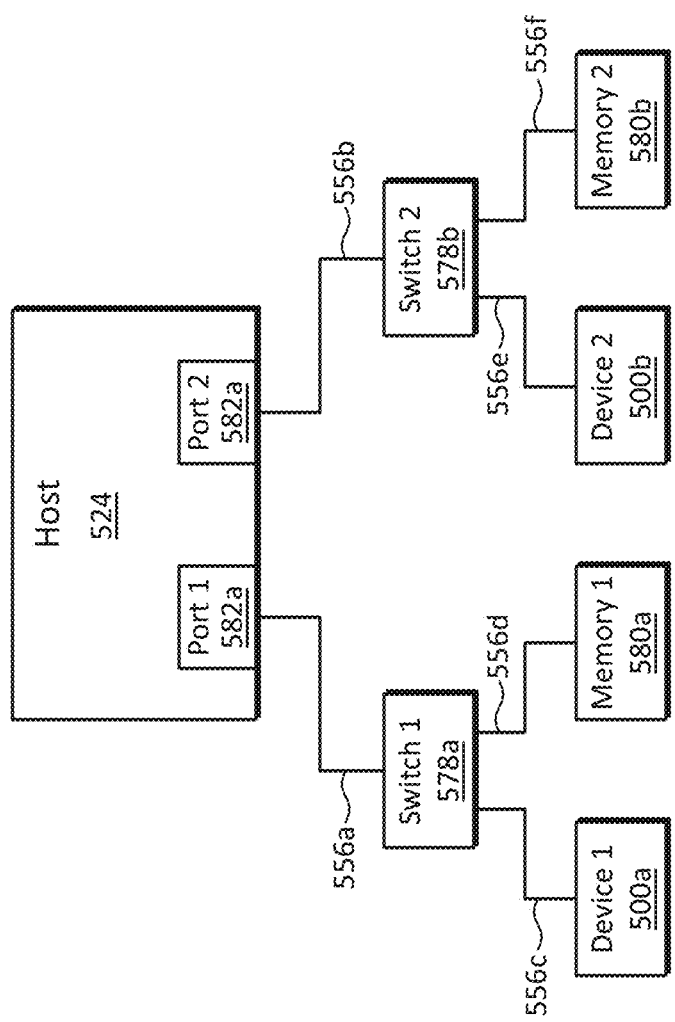
FIG. 5 illustrates an embodiment of a system with disaggregation in accordance with example embodiments of the disclosure.

FIG. 5 illustrates an embodiment of a system with dis-aggregation in accordance with example embodiments of the disclosure. The system illustrated in FIG. 5 may include a host 524 connected to a first switch 578a and a second switch 578b through interconnects 556a and 556b, respectively. The first switch 578a may be connected to a first device 500a and a first memory 580a through interconnects 556c and 556d, respectively. The second switch 578b may be connected to a second device 500b and a second memory 580b through interconnects 556e and 556f, respectively. In some embodiments, the first and second switches 578a and 578b, and interconnects 556a-556f (which may collectively form an interconnect fabric) may be implemented with PCIe switches and/or interconnects using CXL protocol.

The first and second devices 500a and 500b may be implemented, for example, with one or more devices having accelerator virtualization and/or tiered memory in accordance with example embodiments of the disclosure.

The system illustrated in FIG. 5 may enable resources such as the first and second switches 578a and 578b and the first and second memories 580a and 580b to be taken online and/or offline based, for example, on current processing and/or memory demands. One or more of the resources may be time multiplexed, for example, across domains. Moreover, one or more of downstream ports (e.g., host root ports 582a and 582b) and or switches (e.g., switches 578a and 578b) may be virtualized, for example, for use with multiple virtual NPUs 406-1, . . . , 406-N illustrated in FIG. 5. In some embodiments, one or more of the devices 500a and 500b may be implemented as a multi-headed device with multiple ports for use, for example, may multiple virtual accelerators.

The system illustrated in FIG. 5 may also include a fabric manager that may perform one or more functions such as device discovery, virtual switch creation and/or management, binding virtual ports to physical ports, and/or the like, In some embodiments, the fabric manager may be located at the host 524 and implemented, for example, with one or more device drivers. In some embodiments, the fabric manager may be implemented in a sideband configuration, for example, with a system management bus (SMBus). Although the embodiment illustrated in FIG. 5 is shown with two switches, two devices, and two memories, any number of components, may be used with any number of switches, interconnects, and/or the like using any level of switching.

A device having accelerator virtualization and/or tiered memory in accordance with example embodiments of the disclosure may be used to implement various types of parallelism. For example, data parallelism may involve splitting data for a workload across multiple accelerator devices, each of which may have the same model. Depending on the implementation details, data parallelism may be compute bound, especially for large models. However, a device having a tiered memory system in accordance with example embodiments of the disclosure may accommodate a large model, for example, in a capacity-enhanced memory of the second memory tier. Moreover, the use of a cache in the second memory tier may compensate for potential latency issues with the capacity-enhanced memory, With model parallelism, portions of a model may be split across multiple accelerators, and the same data may be processed by each accelerator. For example, if a model is split in half between NPU0 and NPU1, all or a portion of the data may be processed first by NPU0, then the same data may be processed by NPU1. Model parallelism may be used, for example, for allreduce algorithms and/or all-to-all (A2A) communication where one or more (sometimes all) NPUs communicate with one or more (sometimes all) other NPUs after each epoch. A device having accelerator virtualization in accordance with example embodiments of the disclosure may accommodate model parallelism, for example, by enabling each of multiple virtual accelerators to handle a portion of a model.

In some embodiments, choosing between data parallelism and model parallelism may involve one or more tradeoffs. For example, with a large model, data parallelism may be difficult to implement because the entire model may be replicated and stored at each accelerator. Moreover, with data parallelism, the data may need to be synchronized for training a DL model. For example, weights may be synchronized during training because each accelerator may be working on the same model with different training data, so the system may synchronized data and determine one or more average values for weights for each epoch. With model parallelism, fewer memory and/or storage resources may be used to store only a portion of the model at each accelerator, and training synchronization issues may be avoided. However, depending on the implementation details, communication between accelerators may increase.

Depending on the implementation details, the device 400 illustrated in FIG. 4 may reduce or eliminate tradeoffs, for example, when implementing model parallelism with allreduce and/or all-to-all communication primitives. For example, the use of a coherent interface such as CXL may enable multiple NPUs (e.g., multiple NPUs 406 at different instances of device 400 and/or multiple virtual NPUs 406-1, . . . , 406-N within a single device 400) to exchange data at a smaller granularity (e.g., using CXL flits). Thus, the allreduce engine 454 may be configured as a station that may gather updates from various NPUs using CXL primitives and/or launching data lines as needed by the various NPUs. In some embodiments, the allreduce engine 454 may also be configured to implement message passing interface (MPI) send and/or receive primitives over the interconnect 430 and/or network 431. Depending on the implementation details, this may enable scaling out the system to multiple accelerators over the network 431 with model parallelism. Moreover, CXL may enable coherence across multiple accelerators distributed within a device (e.g., as one or more NPUs 406 and/or one or more virtual NPUs 406-1, . . . , 406-N), a server, a rack, across a network, and/or the like. Thus, in some embodiments, the allreduce engine 454 may implement a combination of MPI and CXL, which may clear CXL requests to gather updates for use by the device 400 and/or generate updates that other devices may use for scaling up to multiple NPUs. Depending on the implementation details, this may enable the allreduce engine 454 to exchange and/or schedule tensors efficiently, e.g., using CXL semantics.

Figure 6:
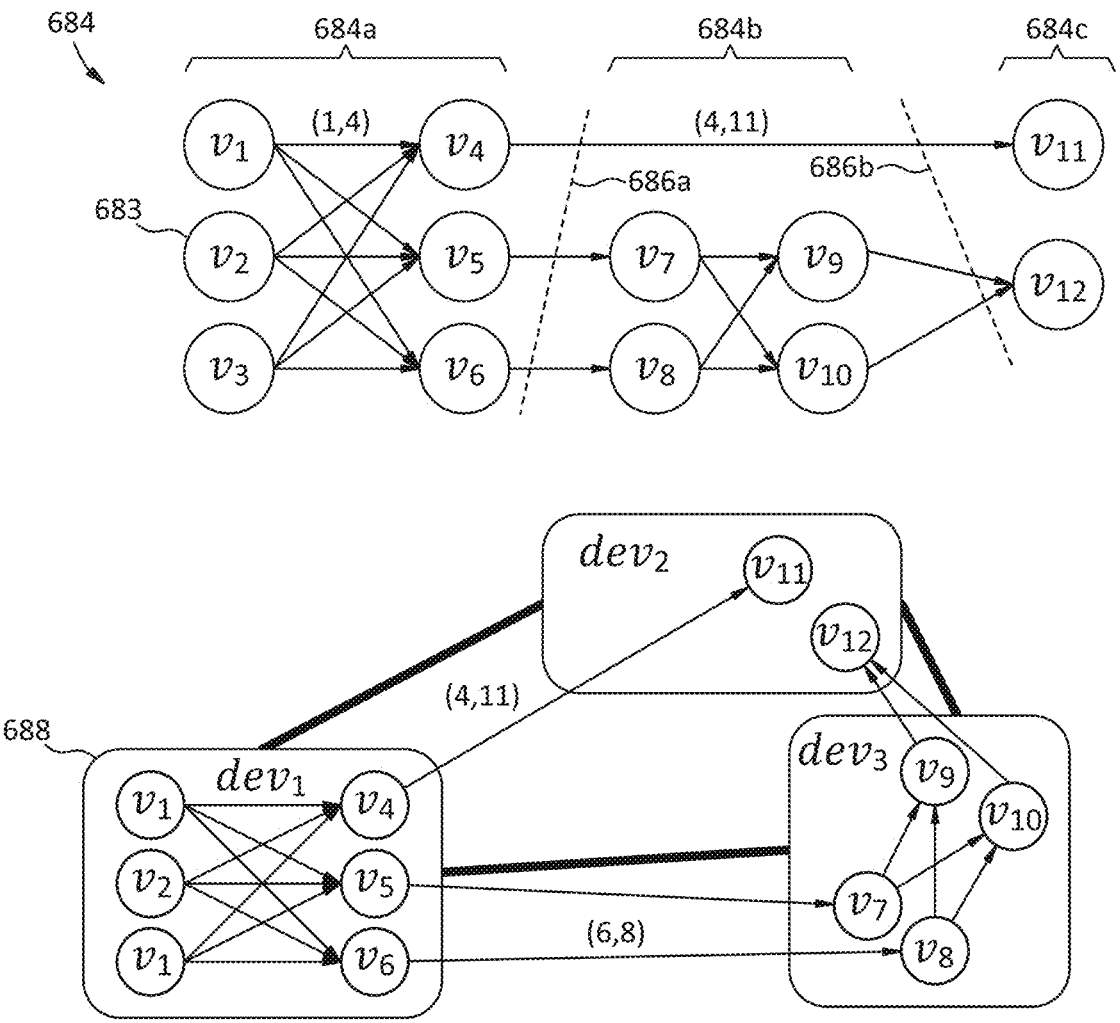
FIG. 6 illustrates an embodiment of a graph, and a method for global partitioning of the graph, in accordance with example embodiments of the disclosure.

FIG. 6 illustrates an embodiment of a graph, and a method for global partitioning of the graph, in accordance with example embodiments of the disclosure. The graph 684 illustrated in FIG. 6 may include twelve vertices 683 indicated as $v_1$ through $v_{12}$ connected by edges (x, y) where x and y may indicate vertices connected by the edge. With directed edges, x and y may indicate the origin and destination vertices, respectively. With undirected edges, x and y may be unordered. Thus, edge (1,4) indicates the edge between vertex $v_1$ and vertex $v_4$. (To prevent obscuring the drawing, not all edges may be labeled.)

The graph 684 may be globally partitioned by splitting it at dashed lines 686a and 686b into three portions 684a (which may include vertices $v_1$ through $v_6$), 684b (which may include vertices $v_7$ through $v_{10}$), and 684c (which may include vertices $v_n$ through $v_{12}$). The graph 684 may be partitioned, for example, by an application running on a host and implementing an ML framework such as TensorFlow, PyTorch, and/or the like, The application may partition the vertices into three accelerator devices 688 indicated as $dev_1$ through $dev_3$. Specifically, the application may partition vertices the first portion 684a of the graph into $dev_1$, the second portion 684b of the graph into $dev_3$, and the third portion 684c of the graph into $dev_2$. The application may partition the vertices based, for example, on one or more parameters of the graph elements (e.g., vertices and/or edges) such as memory to be used, computation time, and/or the like, and one or more parameters of the accelerator devices 688 such as compute resources, memory, interconnects, and/or the like, Although the graph illustrated in FIG. 6 may include twelve vertices and 17 edges and may be partitioned into three portions, in other embodiments, any number of vertices, edges, and/or partitions in any configuration, may be used.

Figure 7:
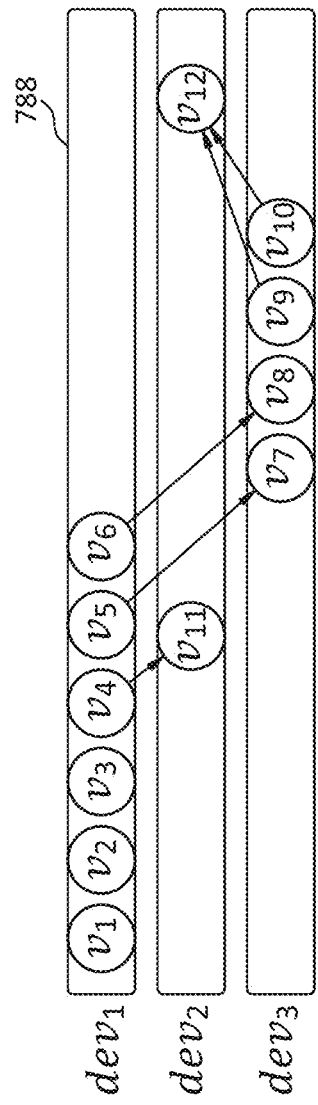
FIG. 7 illustrates a local scheduling operation in accordance with example embodiments of the disclosure.

FIG. 7 illustrates a local scheduling operation in accordance with example embodiments of the disclosure. The embodiment illustrated in FIG. 7 may be used, for example, to schedule graph processing operations for the portions 684*a*, 684*b*, and 684*c* of the graph using the accelerator devices 788 indicated as $dev_1$, $dev_3$, and $dev_2$, respectively, into which they have been partitioned as illustrated in FIG. 6.

Referring to FIG. 7, edges for which both vertices are within one device (e.g., edge (1,4)) may be scheduled for processing with the corresponding device (e.g., $dev_1$). Edges between vertices that span two devices (e.g., edge (4,11)) may be scheduled for processing by one or both of the corresponding devices. For example, the device dev, containing the destination vertex $v_{11}$ may process edge (4,11).

Figure 8:
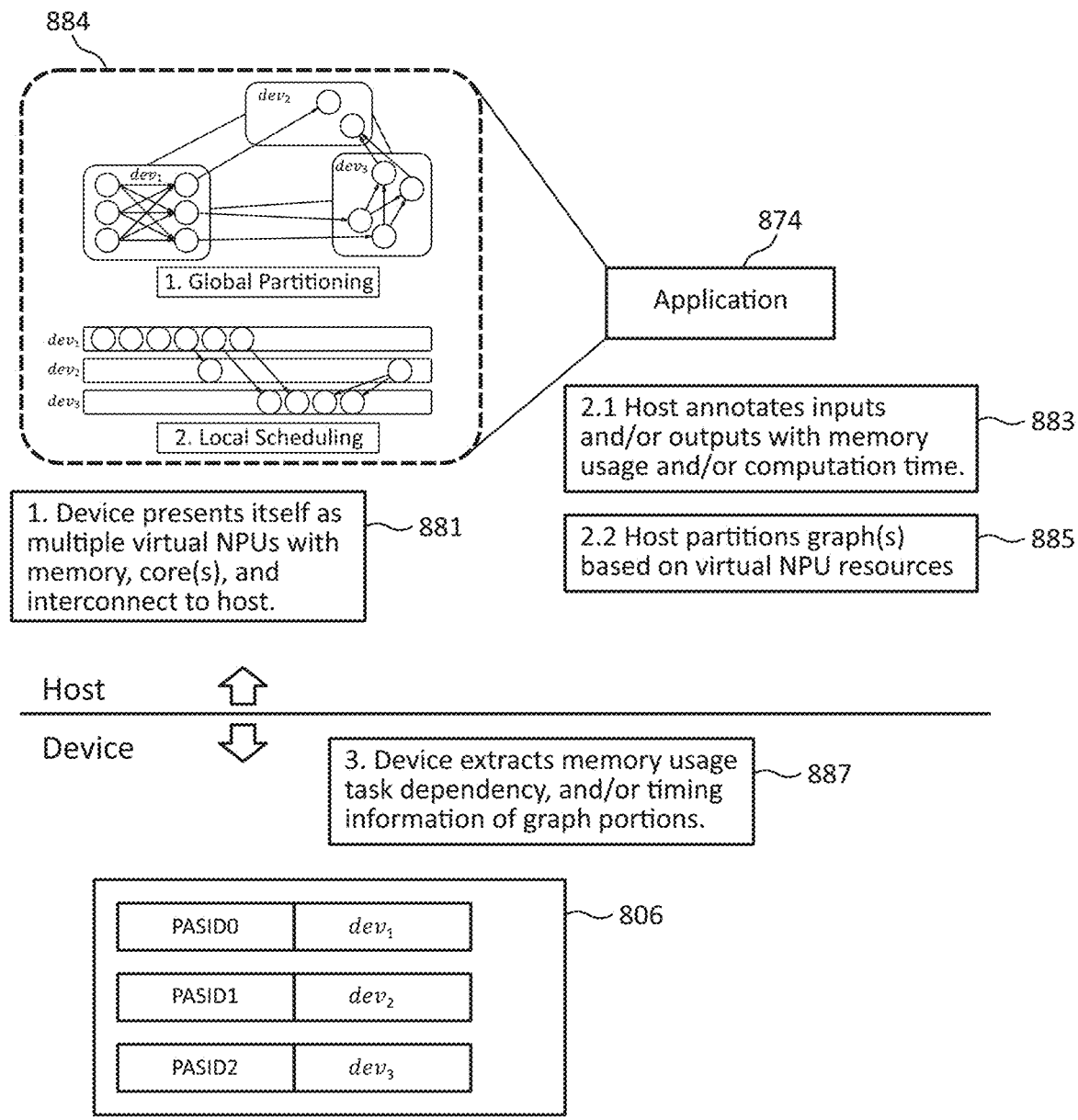
FIG. 8 illustrates an embodiment of a device virtualization method in accordance with example embodiments of the disclosure.

FIG. 8 illustrates an embodiment of a device virtualization method in accordance with example embodiments of the disclosure. Although the embodiment illustrated in FIG. 8 may be used for any type of application, depending on the implementation details, some embodiments may be especially useful for implementing device virtualization for multiple large DNNs. For purposes of illustrating the principles of the disclosure, the method illustrated in FIG. 8 uses the graph and graph partitions illustrated in FIG. 6 and FIG. 7. However, the principles may be implemented with any other graphs, models, and/or the like, and partitions thereof.

Referring to FIG. 8, for purposes of illustration a graph 884 may be implemented in a manner similar to the graph 684 illustrated in FIG. 6, but any other graph, model, and/or the like, may be used. In this embodiment, operations 881, 883, and 885 may be performed by a host, and operation 887 may be performed by a device, but in other embodiments, the operations may be distributed differently. The host and device may be implemented, for example, using any of the host and/or devices disclosed herein, including those described with respect to FIG. 2, FIG. 3, FIG. 4, and/or FIG. 5. The graph 884 may be implemented, for example, by an application 874 such as an ML framework running on the host.

Referring to FIG. 8, at operation 881 (Part 1.), during a configuration process prior to runtime, a device may present itself to the host as multiple virtual NPUs, each having one or more resources including, for example, one or more processor cores, memory (e.g., tiered or non-tiered memory), interconnects, and/or the like. In some embodiments, one or more interconnects to the host may be implemented as inter-device and/or intra-device.

At operation 883 (Part 2.1), the host may annotate graph inputs and/or outputs with one or more parameters such as an amount of memory to be used, a computation time, and/or the like.

At operation 885 (Part 2.2), the host may partition the graph 884 into devices $dev_1$, $dev_2$, and $dev_3$, based on one or more parameters of the virtual NPUs such as compute resources (e.g., processor cores), memory, interconnects, and/or the like. In some embodiments, the host may attempt to match the one or more parameters of the graph portions such as memory to be used, computation time, and/or the like, with corresponding parameters of the virtual accelerator devices such as compute resources (e.g., processor cores), memory, interconnects, and/or the like.

Some example values for parameters of the graph portions may be as follows:

$dev_1$: 30 GB, Delta=0;
$dev_2$: 20 GB, Delta=max(0, 10 seconds);
$dev_3$: 28 GB, Delta=0.

At operation 887 (Part 3.), the device (e.g., the device implementing the virtual NPUs) may extract one or more operational parameters from the graph partitions provided by the host such as memory usage, task dependencies, timing information for one or more graph partitions, and/or the like for use at runtime. In some embodiments, the device may set up one or more process address spaces for each virtual device and partition. Each process address space may have a process address space identifier (PASID). In the example illustrated in FIG. 8, the device may set up a process address space PASID0, PASID1, and PASID2 for virtual accelerators $dev_1$, $dev_2$, and $dev_3$, respectively in the physical accelerator 806. In some embodiments, PASID may be implemented in the context of CXL, for example, with CPU dedicated timesharing, shared virtual machines (VMs), and/or shared single root input and/or output virtualization (SR-IOV).

Figure 9:
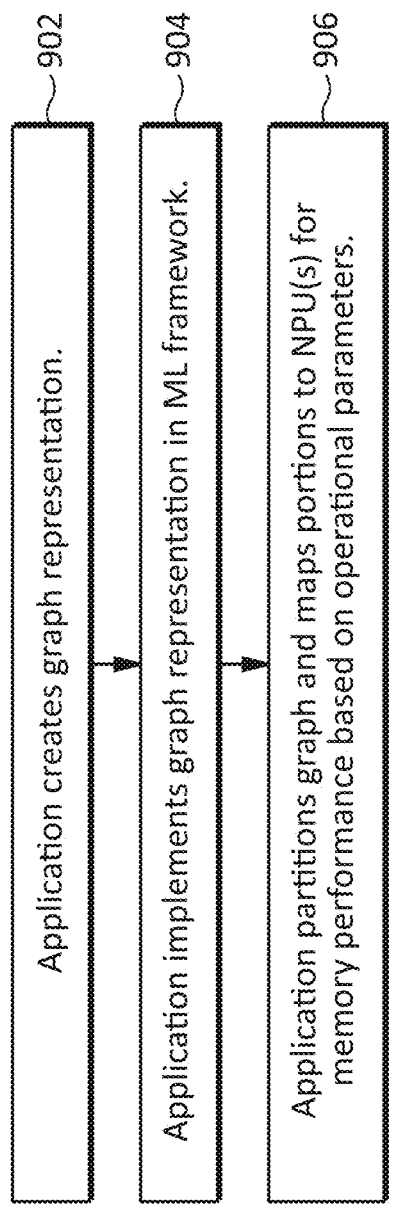
FIG. 9 illustrates an embodiment of a workflow for device virtualization method in accordance with example embodiments of the disclosure.

FIG. 9 illustrates an embodiment of a workflow for device virtualization method in accordance with example embodiments of the disclosure. The workflow illustrated in FIG. 9 may be used, for example, with the methods illustrated in FIG. 8 and FIG. 10.

Referring to FIG. 9, at operation 902, one or more user applications running, for example, at a host, may create one or more graph representations. At operation 904, the one or more applications may implement the one or more graph representations using an ML framework, At operation 906, the one or more applications may partition a graph into one or more portions and map the one or more portions into one or more NPUs (e.g., virtual NPUs), for example, for memory performance (e.g., optimization) based on operational parameters such as task dependency, peak memory capacity, minimum synchronization overhead, and/or the like.

Figure 10A:
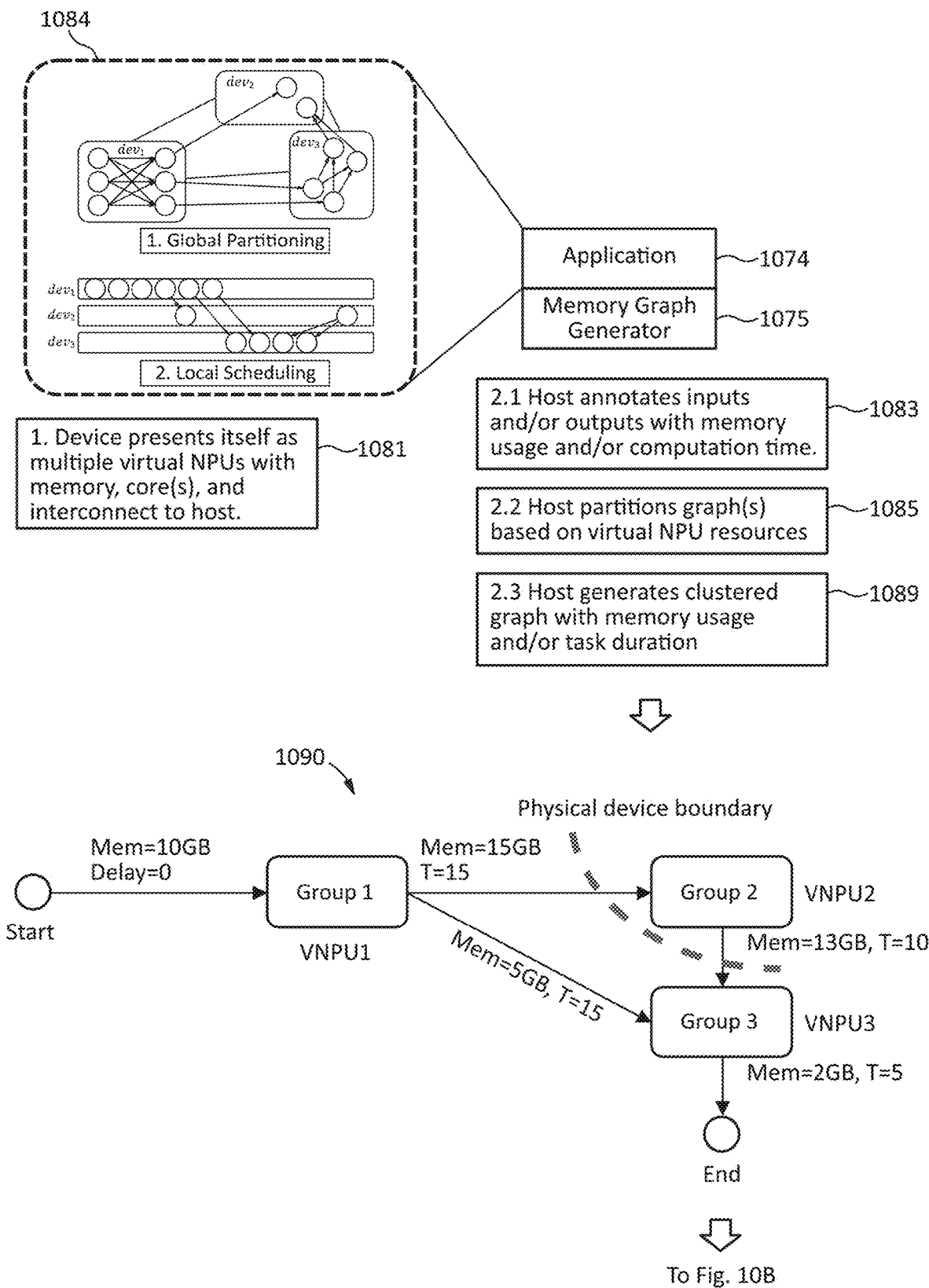

FIG. 10A and FIG. 10B, which collectively form FIG. 10, illustrate an embodiment of a memory scheduling method in accordance with example embodiments of the disclosure. Although the embodiment illustrated in FIG. 10 may be used for any type of application, depending on the implementation details, some embodiments may be especially useful for implementing memory scheduling for multiple large DNNs. For purposes of illustrating the principles of the disclosure, the method illustrated in FIG. 10 uses the graph and graph partitions illustrated in FIG. 6 and FIG. 7. However, the principles may be implemented with any other graphs, models, and/or the like, and partitions thereof.

Referring to FIG. 10A, for purposes of illustration, a graph 1084 may be implemented in a manner similar to the graph 684 illustrated in FIG. 6, but any other graph, model, and/or the like, may be used. In this embodiment, operations 1081, 1083, 1085, and 1089 may be performed by a host. The graph 1084 may be implemented, for example, by an application 1074 such as an ML framework running on the host, and a memory graph generator 1075 may be implemented on the host as well. In other embodiments, however, the operations may be distributed differently, for example, between a host and a device. A host and device may be implemented, for example, using any of the host and/or devices disclosed herein, including those described with respect to FIG. 2, FIG. 3, FIG. 4, and/or FIG. 5.

Referring to FIG. 10, at operation 1081 (Part 1.), during a configuration process prior to runtime, a device (e.g., a CXL Type-2 device) may present itself to the host as multiple virtual NPUs, each having one or more resources including, for example, one or more processor cores, memory (e.g., tiered or non-tiered memory), interconnects, and/or the like.

At operation 1083 (Part 2.1), the host may annotate graph inputs and/or outputs with one or more parameters such as an amount of memory to be used, a computation time, and/or the like.

At operation 1085 (Part 2.2), the host may partition the graph 884 into devices $dev_1$, $dev_2$, and $dev_3$, based on one or more parameters of the virtual NPUs such as compute resources (e.g., processor cores), memory, interconnects, and/or the like. In some embodiments, the host may attempt to match the one or more parameters of the graph portions such as memory to be used, computation time, and/or the like, with corresponding parameters of the virtual accelerator devices such as compute resources (e.g., processor cores), memory, interconnects, and/or the like.

Some example values for parameters of the graph portions may be as follows:

$dev_1$: 30 GB, Delta=0;
$dev_2$: 20 GB, Delta=max(0, 10 seconds);
$dev_3$: 28 GB, Delta=0.

At operation 1089 (Part 2.3), the host (e.g., using the memory graph generator 1075) may generate a clustered graph 1090 with memory capacities and/or duration information. The clustered graph 1090 may include data groups (indicated as Group 1, Group 2, and Group 3) distributed between virtual NPUs (indicated as VNPU1, VNPU2, and VNPU3). In the embodiment illustrated in FIG. 10A, VNPU1 (Group 1) and VNPU2 (Group 3) may be implemented on a first physical device (Device 1), and VNPU3 (Group 2) may be implemented on a second physical device (Device 2). The memory usages and timing values shown for the clustered graph 1090 illustrated in FIG. 10A may be implemented on the two physical devices as shown in FIG. 10B.

Referring to FIG. 10B, the NPU memory 1008-1 for Device 1, which may function as the working memory for VNPU1 and VNPU2, may be implemented, for example, with the bandwidth-enhanced memory 408 illustrated in FIG. 4. The tiered memory 1010-1 for Device 1 may be implemented, for example, with the latency-enhanced memory 410 illustrated in FIG. 4. Similarly, the NPU memory 1008-2 for Device 2, which may function as the working memory for VNPU3, may be implemented, for example, with the bandwidth-enhanced memory 408 illustrated in FIG. 4, and the tiered memory 1010-2 for Device 2 may be implemented, for example, with the latency-enhanced memory 410 illustrated in FIG. 4.

Referring again to FIG. 10B, the Group 1 data initially may be loaded into the NPU memory 1008-1 for Device 1. As VNPU1 processes the Group 1 data, it may gradually swap out data to the tiered memory 1010-1, for example, on a priority basis as shown at (1). Also, as VNPU1 processes the Group 1 data, it may transfer data, for example, the 15 GB block, at time T8 as shown at (2), to the NPU memory 1008-2 of Device 2 where it may be processed in Group 2 by VNPU3. Similarly, after processing the 13 GB block of data, VNPU3 may transfer the data, to the NPU memory 1008-1 of Device 1 as shown at (4), where it may be processed as part of Group 3 by VNPU2. In the intervening time, VNPU2 at Device 1 may begin processing the Group 3 data, for example, as soon as it has a minimum amount of data and/or memory to process as shown at (3).

Figure 11:
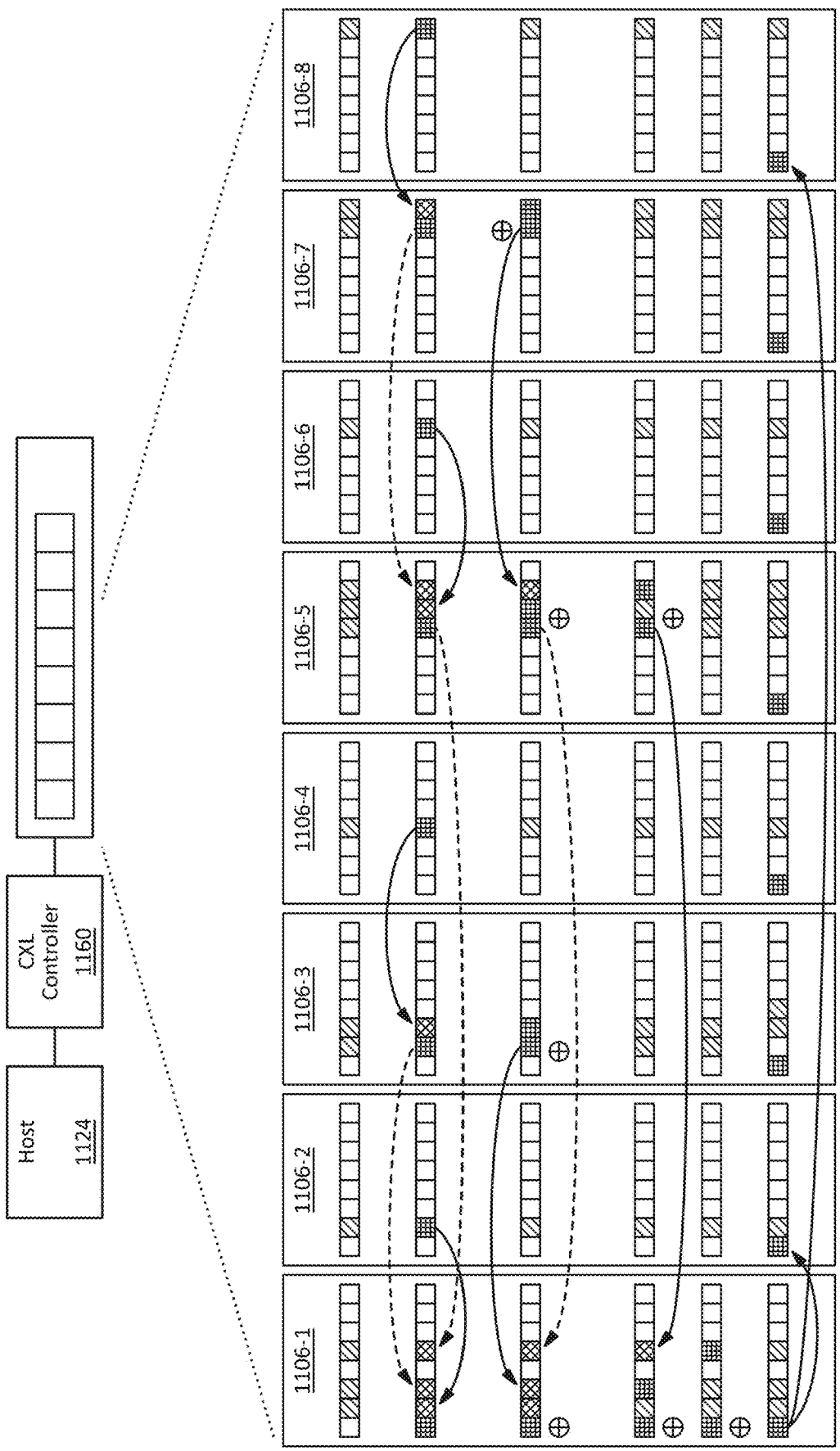
FIG. 11 illustrates an embodiment of an allreduce operation method in accordance with example embodiments of the disclosure.

FIG. 11 illustrates an embodiment of an allreduce operation method in accordance with example embodiments of the disclosure. The embodiment illustrated in FIG. 11 may be implemented, for example, using any of the hosts and/or devices disclosed herein, including those described with respect to FIG. 2, FIG. 3, FIG. 4, and/or FIG. 5.

Referring to FIG. 11, the method may be implemented using a host 1124, an interconnect controller (e.g., a CXL controller) 1160, and one or more devices 1106 having one or more accelerators. For purposes of illustration, the embodiment illustrated in FIG. 11 is implemented with eight accelerators 1106-1 through 1106-8, however, the principles may be applied with any number of devices. The accelerators 1106-1 through 1106-8 may be implemented with physical accelerators, virtual accelerators, or any combination thereof. In some embodiments, the embodiment illustrated in FIG. 11 may be implemented partially or entirely with the allreduce engine 454 illustrated in FIG. 4B.

Referring to FIG. 11, the method may proceed as shown by the solid and dashed arrows wherein the different shading indicates different datasets and the e operator indicates an allreduce operation.

Figure 12:
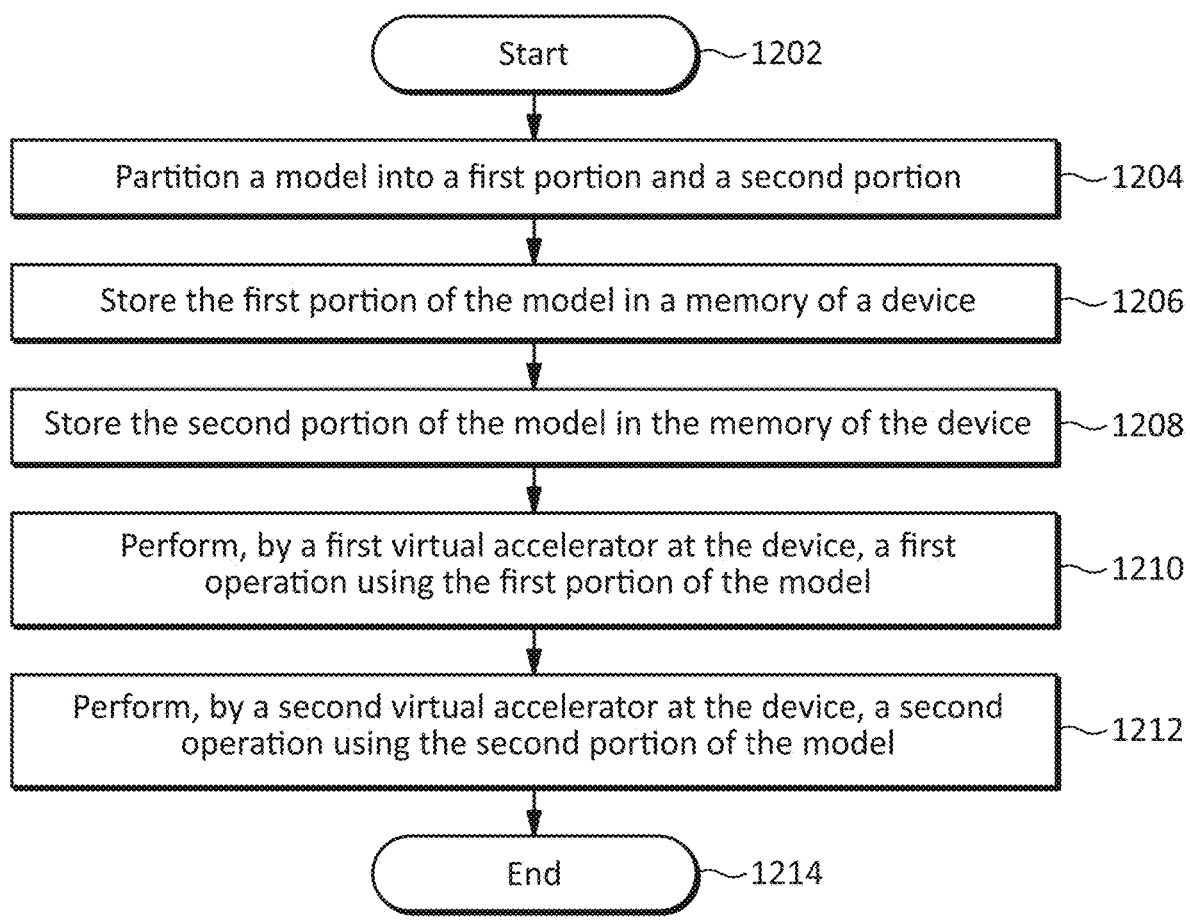
FIG. 12 illustrates an embodiment of a method for processing data with a model in accordance with example embodiments of the disclosure.

FIG. 12 illustrates an embodiment of a method for processing data with a model in accordance with example embodiments of the disclosure. The method may begin at operation 1202. At operation 1204, the method may partition a model into a first portion and a second portion. For example, the method may partition the model based on one or more parameters of the model and/or one or more parameters of a first virtual accelerator and a second virtual accelerator. At operation 1206, the method may store the first portion of the model in a memory of a device. At operation 1208, the method may store the second portion of the model in the memory of the device. In some embodiments, the memory may be implemented as a tiered memory. At operation 1210, the model may perform, by the first virtual accelerator at the device, a first operation using the first portion of the model. At operation 1212, the method may perform, by the second virtual accelerator at the device, a second operation using the second portion of the model. The method may end at operation 1214.

The embodiment illustrated in FIG. 12, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Any of the functionality described herein, including any of the host functionality, device functionally, and/or the like, including that described with respect to FIG. 1 through FIG. 12 for example, an accelerator, IO engine, allreduce engine, compression and/or decompression logic, memory switch, memory manager, preprocessor, virtualization logic, memory access pattern analyzer, DCOH, and/or the like, may be implemented with hardware, software, or any combination thereof including combinational logic, sequential logic, one or more timers, counters, registers, state machines, CPLDs, FPGAs, ASICs, CPUs including CISC processors such as x86 processors and/or RISC processors such as ARM processors, GPUs, NPUs, TPUs, and/or the like, executing instructions stored in any type of memory. In some embodiments, one or more components may be implemented as a system-on-chip (SOC).

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc, may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A device comprising:
   an interconnect interface;
   a memory system comprising:
      one or more first-type memory devices configured to be high-bandwidth coupled to the interconnect interface through a memory switch, to receive first data;
      one or more second-type memory devices coupled to be low-latency, coupled to the interconnect interface through the memory switch to receive second data; and
   an accelerator coupled through the memory switch to the one or more first-type memory devices and the one or more second-type memory devices and configured to perform an operation using the first data and the second data, wherein the memory switch is programmable to configure the one or more first-type memory devices and the one or more second-type memory devices.

2. The device of claim 1, wherein the memory system further comprises a cache configured to cache the second data for the one or more second-type memory devices.

3. The device of claim 1, further comprising a coherency engine configured to maintain a coherency of at least one of the one or more first-type memory devices.

4. The device of claim 1, wherein the memory switch is arranged to configure one or more connections between the one or more first-type memory devices and the accelerator.

5. The device of claim 1, further comprising a memory manager configured to exchange the first data between the one or more first-type memory devices and the accelerator.

6. A device comprising:
   an interconnect interface;
   a memory system coupled to the interconnect interface through a memory switch to receive data, wherein the memory system comprises a first component of a first type and a second component of a second type;
   an accelerator coupled through the memory switch to the memory system; and
   virtualization logic configured to partition one or more resources of the accelerator into one or more virtual accelerators; and
   wherein a first one of the one or more virtual accelerators is configured to perform a first operation on a first portion of the data, and the memory switch is programmable to configure the first component of the first type and the second component of the second type.

7. The device of claim 6, wherein a second one of the one or more virtual accelerators is configured to perform a second operation on a second portion of the data.

8. The device of claim 6, wherein the first one of the one or more virtual accelerators is configured to:
   receive, through the interconnect interface, one or more operational parameters; and
   perform the first operation on the first portion of the data based on the one or more operational parameters.

9. The device of claim 6, further comprising a memory manager configured to schedule one or more components of the memory system for one or more portions of the first operation.

10. The device of claim 9, wherein the memory manager is configured to schedule the one or more components of the memory system based on a memory access pattern.

11. The device of claim 9, wherein the memory manager is configured to:
    determine the first component of the memory system based on a bandwidth sensitivity; and
    direct data from the first component of the memory system to the second component of the memory system.

* * * * *